United States Patent [19]

Wakamiya et al.

[11] Patent Number: 5,266,996
[45] Date of Patent: Nov. 30, 1993

[54] RECORDING APPARATUS

[75] Inventors: Koji Wakamiya, Osaka; Tomohiko Masuda, Takatsuki; Atsushi Fujita, Otsu; Tsukasa Yagi, Toyonaka, all of Japan

[73] Assignee: Minolta Camera Kabushiki Kaisha, Osaka, Japan

[21] Appl. No.: 781,061

[22] Filed: Oct. 18, 1991

[30] Foreign Application Priority Data

| Oct. 19, 1990 | [JP] | Japan | 2-282477 |
| Oct. 19, 1990 | [JP] | Japan | 2-282478 |
| Oct. 19, 1990 | [JP] | Japan | 2-282479 |
| Oct. 20, 1990 | [JP] | Japan | 2-282610 |
| Oct. 20, 1990 | [JP] | Japan | 2-282611 |
| Oct. 20, 1990 | [JP] | Japan | 2-282612 |
| Oct. 20, 1990 | [JP] | Japan | 2-282613 |
| Oct. 20, 1990 | [JP] | Japan | 2-282614 |
| Oct. 20, 1990 | [JP] | Japan | 2-282615 |

[51] Int. Cl.$^5$ ............................................. G03G 21/00
[52] U.S. Cl. .................................... 355/202; 346/108; 355/200; 355/210; 358/437
[58] Field of Search ............... 355/200, 202, 210; 358/405–407, 434–437, 439, 302, 300, 296; 346/108

[56] References Cited

U.S. PATENT DOCUMENTS

| 3,914,539 | 10/1975 | Hashimoto | 178/6 |
| 4,046,471 | 9/1977 | Branham | 358/300 X |
| 4,727,435 | 2/1988 | Otami et al. | 358/296 |
| 4,794,419 | 12/1988 | Shibazaki et al. | 355/3 R |
| 4,920,427 | 4/1990 | Hirata | 358/296 X |
| 4,967,240 | 10/1990 | Kitano et al. | 355/318 |
| 4,972,226 | 11/1990 | Kawai | 355/202 |
| 5,099,293 | 3/1992 | Kawai | 355/202 X |
| 5,119,206 | 6/1992 | Rourke et al. | 358/296 |
| 5,124,798 | 6/1992 | Tanabe et al. | 358/296 |
| 5,128,772 | 7/1992 | Farrell et al. | 358/300 |

FOREIGN PATENT DOCUMENTS

| 3526886 | 2/1986 | Fed. Rep. of Germany | 355/202 |
| 0099065 | 6/1983 | Japan | 358/406 |
| 0085676 | 5/1985 | Japan | 358/405 |
| 0128770 | 7/1985 | Japan | 358/437 |
| 0270968 | 11/1987 | Japan | 355/202 |

Primary Examiner—A. T. Grimley
Assistant Examiner—Matthew S. Smith
Attorney, Agent, or Firm—Willian Brinks Olds Hofer Gilson & Lione

[57] ABSTRACT

A recording apparatus has both a copier function and a fax printing function. The recording apparatus is provided with a photoconductive member, an original table on which an original is placed, and a scanner for scanning the original placed on the original table to project an image of the original onto the photoconductive member so that an electrostatic latent image may be formed on the photoconductive member. An optical print head is provided for forming an electrostatic latent image on the photoconductive member based on an electric signal. Accordingly, the recording apparatus has two modes, a copy mode in which an electrostatic latent image is formed by an operation of the scanner and a print mode in which an electrostatic latent image is formed by an operation of the optical print head. A plurality of sensors are provided for detecting the operation of the scanner, which is controlled by a controller in each of the copy mode and the print mode. The electrostatic latent image formed on the photoconductive member is transferred as a visible image on a recording medium by a transfer unit.

33 Claims, 20 Drawing Sheets

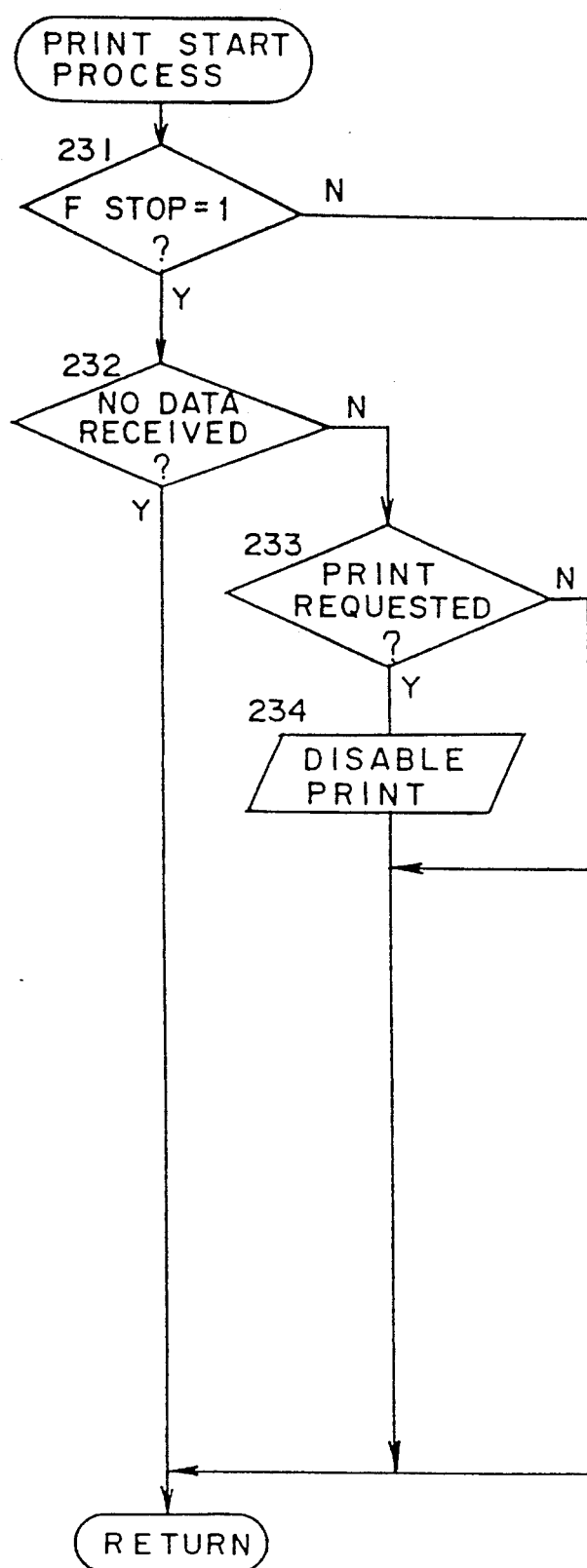

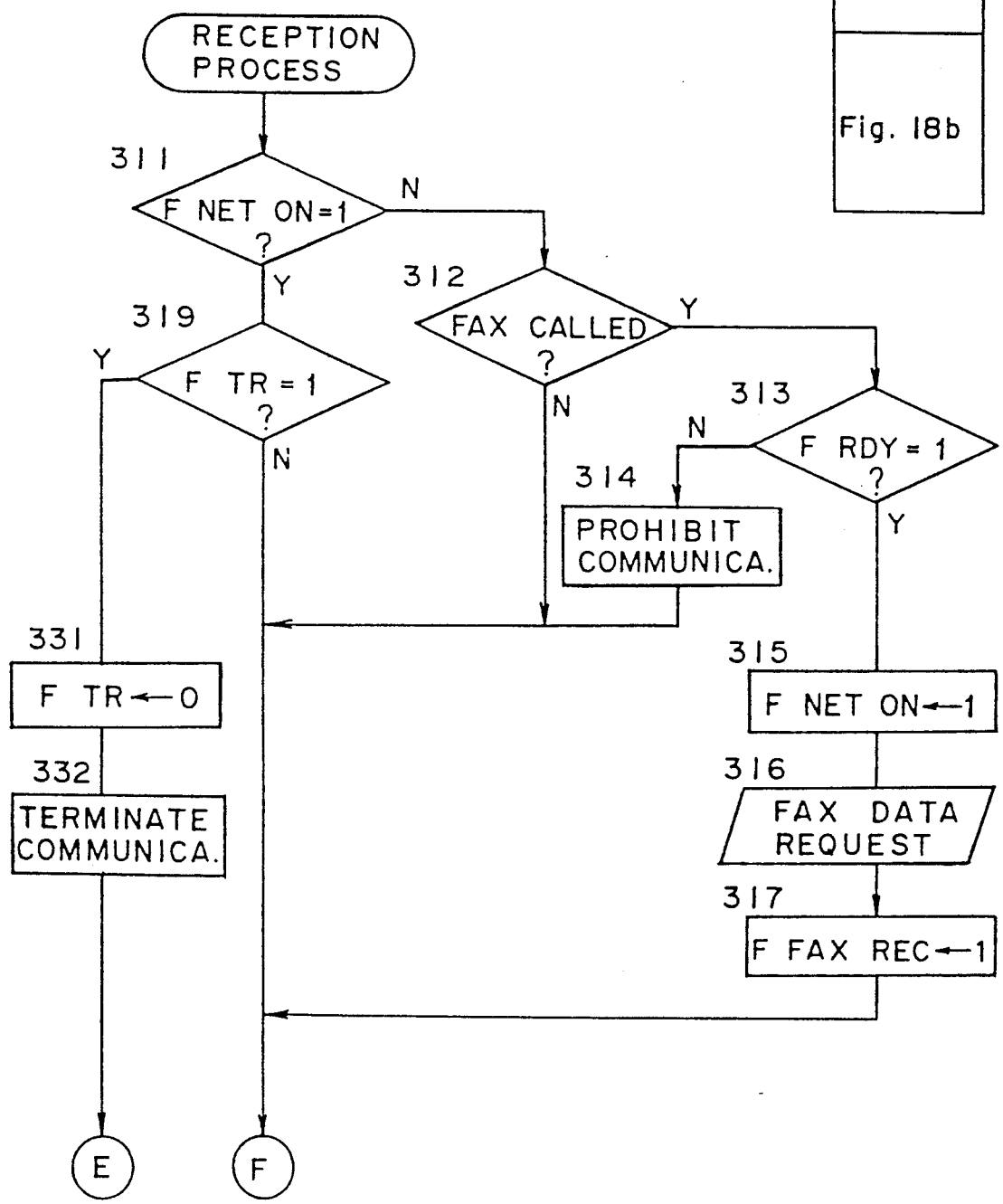

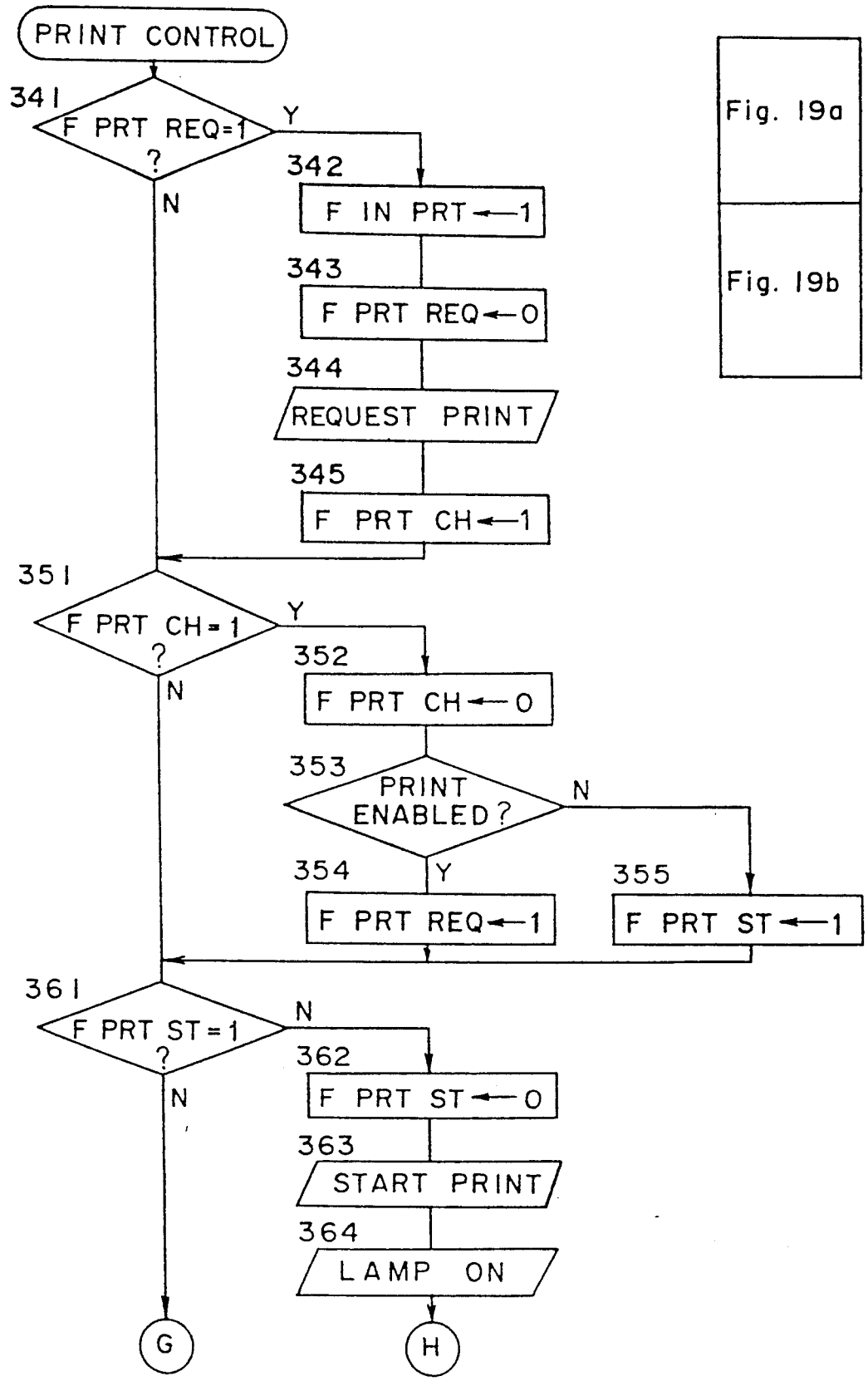

ND APPARATUS

BACKGROUND OF THE INVENTION

1. Field of the Invention

The present invention relates to a recording apparatus having a function for copying an original document and a function for printing stored text and other image data. The copying operation is generally performed by projecting image light from the original document on a photoconductive member whereas the printing operation is generally performed by selectively exposing the photoconductive member based on an electric signal.

2. Description of the Prior Art

While a recording apparatus has as its basic function the duplication of an original document by an electrophotographic process, the recent trend in such apparatus is towards multiple functionality. One such function is operation as a printer, examples of which include laser beam printers and liquid crystal printers in which the processes used in document duplication are used in common with the printing operation after formation of a latent image on a photoconductive member.

When a document is copied on the above-described conventional recording apparatus, an exposure lamp is held on while a copying optical system and an original table are moved relative to each other so that reflected light from the original may be projected by the copying optical system to form an image on the surface of a recording medium, such as a photoconductive member, rotating at a constant speed. A copy of an original image is then obtained on a copy paper by an electrophotographic process.

However, when printing text and/or images based on stored data, the exposure lamp which operates during the copying operation is turned off and the relative movement between the original table and the copying optical system is stopped. In this condition, an array-type recording unit, such as an LED array, liquid crystal array, or PLZT array, is selectively driven according to the stored data to project an image of the stored data through the recording unit onto the same recording medium used in the copying operation. Thereafter, an image is obtained on the copy paper by the same process used in the copying operation.

However, the following problems are confronted in the conventional recording apparatus.

Specifically, when an electrophotographic process is used, for example, the only difference between the copying function and the stored data printing function is whether the light imaged on the recording medium is reflected light from the original or is light generated according to a stored image. The process after forming the image on the recording medium is common-to both functions. Furthermore, it is necessary to control the photoconductive member rotation and copy paper transport operations so that an image is correctly formed on the copy paper whether the image is a copy or stored image. In the copying operation, these operations are detected by respective detection means to synchronize the relative movement of the original table and the coping optical system. However, during the stored data printing operation, the relative movement of the original table and the copying optical system is stopped in the conventional recording apparatus. Because of this, it is necessary to provide means for detecting the timing in the operation of a recording means in order to control photoconductive member rotation and copy paper transport, making the apparatus more complex and resulting in increased product costs.

Furthermore, while printers effectively print data output from a host computer, they could be even more effectively utilized by providing a facsimile receiver function whereby an image signal received over a telephone line is used as the print data. Unfortunately, while it is easy for the user to control the transmission of print data to a standard printer/copier machine, it is not as easy to control a printer with a facsimile function because an image signal may be sent to the facsimile receiver at any unknown time from a facsimile transmitter in a remote location. The result is complication-of the operations used for copying and for facsimile receiving.

In addition, in the printers, stored data is generally sent out at a relatively high speed whereas the facsimile receivers occasionally receive an image signal sent via the telephone line from a facsimile transmitter of a type having a relatively low transmission speed. In this case, if the recording for the image signal sent from such a facsimile transmitter is performed at a process speed for the copying, the process required for recording the image signal, for example, by one page is completed before all the data for one page are received, thus causing a possibility of data missing.

SUMMARY OF THE INVENTION

The present invention has been developed to overcome the above-described disadvantages.

It is accordingly an object of the present invention to provide an improved recording apparatus with a facsimile function that reduces the possibility of trouble occurring.

Another object of the present invention is to provide a recording apparatus of the above-described type that simplifies the control of those processes which are common to both a copying operation and a recording operation.

A further object of the present invention is to provide a multiple function recording apparatus that is not complicated in construction for the control thereof.

To achieve the aforementioned objects, a recording apparatus according to the present invention comprises a photoconductive member, an original table on which an original is placed, scanner means for scanning the original placed on the original table to project an image of the original onto the photoconductive member so that an electrostatic latent image may be formed on the photoconductive member, recording means for forming an electrostatic latent image on the photoconductive member based on an electric signal, and visible image formation means for forming a visible image on a recording medium from the electrostatic latent image formed on the photoconductive member.

The recording apparatus further comprises selection means for selecting either a copy mode in which an electrostatic latent image is formed by an operation of the scanner means or a print mode in which an electrostatic latent image is formed by an operation of the recording means, detection means for detecting the operation of the scanner means, and control means for operating the scanner means in each of the copy mode and the print mode to control an operation of the visible image formation means in response to the detection means.

In another aspect of the present invention, a recording apparatus comprises a photoconductive member, an original table on which an original is placed, projection means for projecting an image of the original placed on the original table onto the photoconductive member to form an electrostatic latent image on the photoconductive member, reception means for receiving image data from a communication line and for storing the image data for at least one page, recording means for forming an electrostatic latent image on the photoconductive member based on the image data from the reception means, and visible image formation means for forming a visible image on a recording medium from the electrostatic latent image formed on the photoconductive member.

The recording apparatus also comprises selection means for selecting either a copy mode in which an electrostatic latent image is formed by an operation of the projection means or a print mode in which an electrostatic latent image is formed by an operation of the recording means and control means for operating the recording means when the reception means has stored the image data for one page in the print mode.

In a further aspect of the present invention, a recording apparatus comprises an apparatus body for electrophotographically forming a visible image on a recording medium and a facsimile unit for receiving image data from a communication line. The apparatus body comprises a photoconductive member, an original table on which an original is placed, projection means for projecting an image of the original placed on the original table onto the photoconductive member to form an electrostatic latent image on the photoconductive member, recording means for forming an electrostatic latent image on the photoconductive member based on the image data from the facsimile unit, and visible image formation means for forming a visible image on a recording medium from the electrostatic latent image formed on the photoconductive member. On the other hand, the facsimile unit comprises storage means for storing the image data received from the communication line, command generation means for generating a start command required to start an operation of the apparatus body when the image data for at least one page has been stored in the storage means, and transmission means for transmitting the image data stored in the storage means to the recording means.

In a still further aspect of the present invention, a recording apparatus comprises a photoconductive member, an original table on which an original is placed, projection means for projecting an image of the original placed on the original table onto the photoconductive member to form an electrostatic latent image on the photoconductive member, reception means for receiving image data from a communication line, recording means for forming an electrostatic latent image on the photoconductive member based on the image data from the reception means, and visible image formation means for forming a visible image on a recording medium from the electrostatic latent image formed on the photoconductive member.

The recording apparatus further comprises detection means for detecting whether preparations required for forming the visible image on the recording medium have been made and permission means for permitting transmission of the image data from the reception means to the recording means when the detection means has detected that the preparations required for forming the visible image have been made.

In an additional aspect of the present invention, a recording apparatus comprises a photoconductive member, an original table on which an original is placed, first electrostatic latent image formation means for forming a first electrostatic latent image on the photoconductive member by projecting an image of the original placed on the original table onto the photoconductive member, reception means for receiving image data from a communication line, second electrostatic latent image formation means for forming a second electrostatic latent image on the photoconductive member based on the image data from the reception means, visible image formation means for forming a visible image on a recording medium from an electrostatic latent image formed on the photoconductive member, and prohibition means for prohibiting transmission of the image data from the reception means to the second electrostatic latent image formation means when the first electrostatic latent image formation means is in operation.

Alternatively, the prohibition means may be replaced by selection means for selecting either a copy mode or a facsimile mode, input means for inputting arbitrary image formation conditions in the copy mode, and setting means for setting predetermined image formation conditions irrespective of the image formation conditions input from the input means when the copy mode has been switched to the facsimile mode. In the copy mode, the electrostatic latent image is formed on the recording medium by an operation of the first electrostatic latent image formation means and the visible image formation means, whereas, in the facsimile mode, the electrostatic latent image is formed on the recording medium by an operation of the second electrostatic latent image formation means and the visible image formation means.

Furthermore, the prohibition means may be replaced by detection means for detecting whether an error has occurred in the second electrostatic latent image formation means or the visible image formation means and prohibition means for prohibiting the reception means from receiving the image data in response to the detection means.

In addition, the prohibition may be replaced by detection means for detecting whether an error has occurred in the visible image formation means, interruption means for interrupting transmission of the image data from the reception means to the second electrostatic latent image formation means when the detection means has detected an error during an image forming operation by the second electrostatic latent image formation means, and resumption means for resuming transmission of the image data from the reception means to the second electrostatic latent image formation means when the error detected by the detection means has been removed after the transmission of the image data has been interrupted by the interruption means.

The prohibition means may be means for prohibiting the first electrostatic latent image formation means from initiating an operation thereof based on an operation of the reception means.

Preferably, the reception means and the second electrostatic latent image formation means are removably mounted on or in the apparatus body.

Conveniently, the second electrostatic latent image formation means comprises a PLZT (Lead Lanthanum Zirconate Titanate) print head.

BRIEF DESCRIPTION OF THE DRAWINGS

These and other objects and features of the present invention will become more apparent from the following description of the preferred embodiments thereof with reference to the accompanying drawings, throughout which like parts are designated by like reference numerals, and wherein:

FIGS. 11, 12, 13a, 13b, 14-, 16a, 16b, 17, 18a, 18b, 19a, 19b and 20 are flow charts indicative of the operation of the recording apparatus equipped with the operation panel of FIG. 10.

DETAILED DESCRIPTION OF THE PREFERRED EMBODIMENTS

Figure 1:
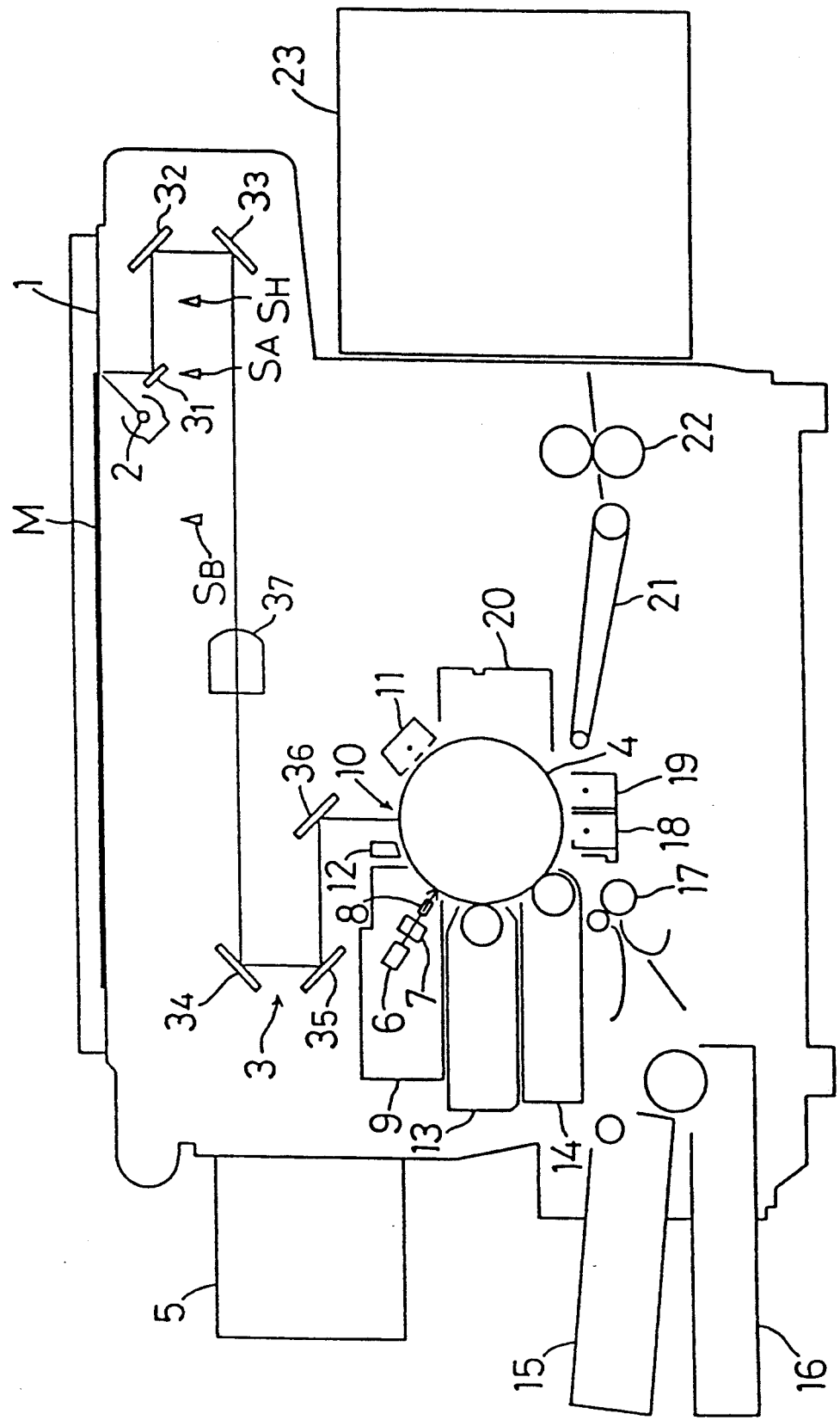
FIG. 1 is a schematic elevational view of a recording apparatus according to the present invention.

Referring now to the drawings, there is schematically shown in FIG. 1 an electrophotographic recording apparatus embodying the present invention.

As shown in FIG. 1, the recording apparatus comprises an original table 1, an exposure lamp 2, and a copying function optics assembly 3. While an original M placed on and held by the original table 1 is illuminated by the exposure lamp 2, the first mirror $3_1$ in the seven element (six mirrors $3_1$–$3_6$ and an imaging lens $3_7$) optics assembly 3 travels with the exposure lamp 2 to the left in the figure at a constant rate, and the second mirror $3_2$ and the third mirror $3_3$ likewise travel together to the left at a speed one-half the above constant rate. As a result, light reflected from the original M is projected to a photoconductor 4 rotating at a constant speed, and thus forming thereon an electrostatic latent image corresponding to an image projected onto the photoconductor 4. It is to be noted that these components move individually while their movements are related, and that the moving parts of the copying function optics assembly 3 may be referred to as the "scanner" and the operation thereof as "scanning."

Furthermore, a facsimile receiver 5 is provided to receive facsimile signals whereby image data may be input to the recording apparatus. Light from a light source 6 is controlled by an optical shutter array 7, which may be of PLZT (Lead Lanthanum Zirconate Titanate), in pixel units based on the image data, and light generated based on stored image data ("stored image light") passing through the optical shutter array 7 passes through a rod lens array 8 to form an image on the photoconductor 4. The light source 6, the optical shutter array 7 and the rod lens array 8 form an optical print head 9, which is the recording means.

The facsimile receiver 5 and- the optical print head are both removably mounted on or in the apparatus body, and these components are mounted on or in an electrophotographic recording apparatus according to the user's request for the facsimile reception.

Around the photoconductor 4 are provided a charger unit 11, which provides a uniform static charge to the surface of the photoconductor 4 and is upstream from an exposure area 10 to which the light reflected from the original M is applied by the optics assembly 3. An eraser 12 is disposed between the exposure area 10 and the optical print head 9. Also provided around the photoconductor 4 but downstream from the optical print head 9 are a pair of developer units 13 and 14, a timing roller 17, a transfer unit 18, a separation unit 19, and a cleaner 20. The developer units 13 and 14 develop the electrostatic latent image on the photoconductor 4 in two colors (red and black). The transfer unit 18 transfers a toner image developed by the developer units 13 and 14 to a recording medium (not shown) fed selectively from a pair of paper supply cassettes 15 and 16 and synchronized by the timing roller 17. After transfer of the toner image, the separation unit 19 separates the recording medium from the photoconductor 4 and the cleaner 20 cleans the surface of the photoconductor 4. After the recording medium is separated from the photoconductor 4, it is transported by a belt 21 to a fixing unit 22 where the toner image is fixed to the surface of the recording medium by heat and pressure, and is then discharged onto a sorter 23.

Three sensors, a home position sensor $S_H$, an image edge sensor $S_A$, and a timing sensor $S_B$, are provided in the path of scanner travel to detect the scanner movement. Detection data from these scanners is used to control recording medium feed and the various processes related to image recording.

Figure 2:
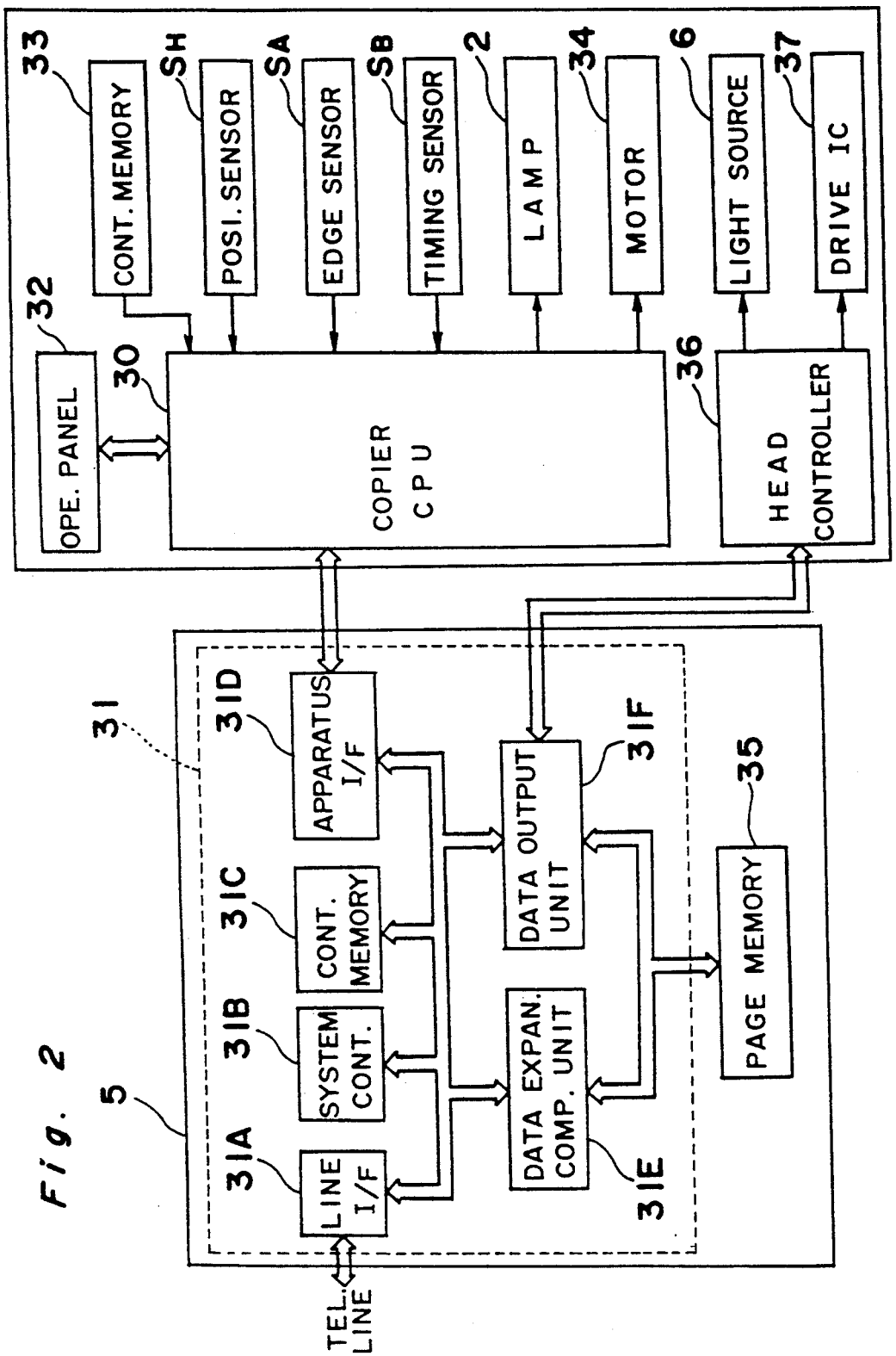
FIG. 2 is a block diagram of a controller used in the recording apparatus of FIG. 1.

FIG. 2 is a block diagram of a controller used in this recording apparatus, which comprises two central processing units (CPU): a copier CPU 30 for controlling the copying operation and a fax CPU 31 for controlling the facsimile signal receiving operation.

Based on command signals received from an operation panel 32 provided on a top panel of the recording apparatus and detector signals from the three sensors $S_H$, $S_A$, and $S_B$, the copier CPU 30 controls the operation of the exposure lamp 2 and a scanner motor 34, which is the scanning drive mechanism, and the operation of the various assemblies (not shown) used for image formation during the aforementioned copying operation. The copier CPU 30 also provides indication of recording apparatus operation on a display panel provided on the operation panel 32.

The fax CPU 31 controls receiving of the facsimile signals over a telephone line, expands the received data and writes to a page memory 35. Also, the fax CPU 31 controls operation of the light source 6 and a drive IC 37 for the optical shutter array 7 through an optical print head controller 36 of the optical print head 9, and thus forms an electrostatic latent image of the facsimile signal data on the photoconductor 4 by means of the stored image light based on the image data.

The fax CPU 31 comprises a line interface 31A for sending and receiving facsimile signals over a telephone line, a system controller 31B for controlling the operation of the facsimile receiver 5, a control memory 31C which may be a RAM or other memory device, an apparatus interface 31D for sending and receiving control signals with the copier CPU 30, an image data expansion/compression unit 31E for expanding and storing the image data received over the telephone line to the page memory 35, and an image data output unit 31F for sending image data in the page memory 35 to the optical print head controller 36.

The operation of the above-described recording apparatus is described below with reference to flow charts in FIGS. 3–9.

Figure 3:
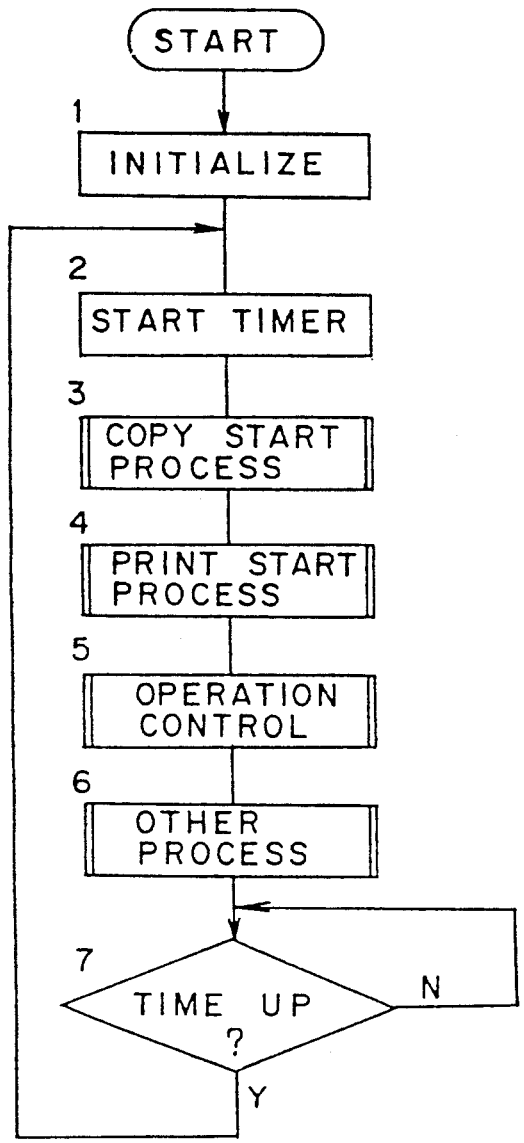
FIGS. 3 to 9 are flow charts indicative of the operation of the recording apparatus of FIG. 1.

FIG. 3 is a flow chart of the main routine executed by the copier CPU 30. When this routine starts, system flags are reset and memories are cleared (step #1), after which an internal timer is started (step #2). A series of subroutines are then called, the first of which is the "copy start process" subroutine shown as step #3.

Figure 4:
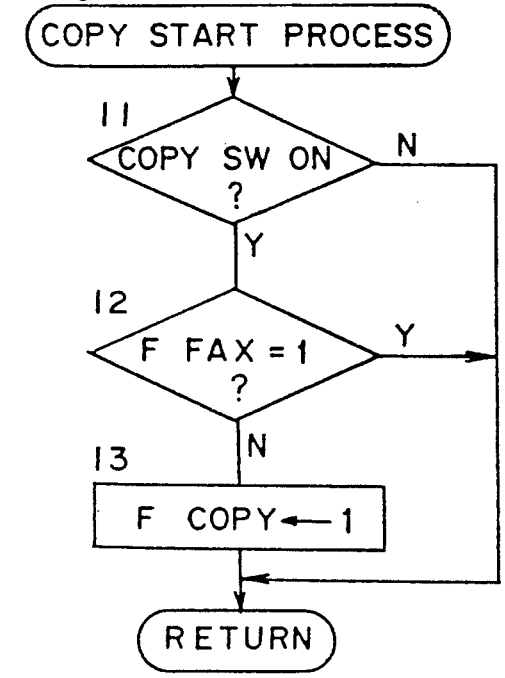

The copy start subroutine starts, as shown in FIG. 4, by checking whether a copy switch has been depressed (step #11). If the copy switch has not been depressed, the subroutine returns to the main routine, but if it has, the procedure advances to step #12 to check a fax flag F-FAX. This fax flag F-FAX is set to "1" when the facsimile receiver 5 is receiving and storing facsimile data. If the fax flag F-FAX is set (=1), facsimile data is being received and the copying operation is thus prohibited. Thereafter, the subroutine returns to the main routine. However, if the fax flag F-FAX is not set, a copy flag F-COPY is set to "1" to prohibit the fax printing or recording operation at step #13, and the subroutine then returns to the main routine.

When the copy start subroutine is exited and the main routine is resumed, the "print start" subroutine is called (step #4).

Figure 5:
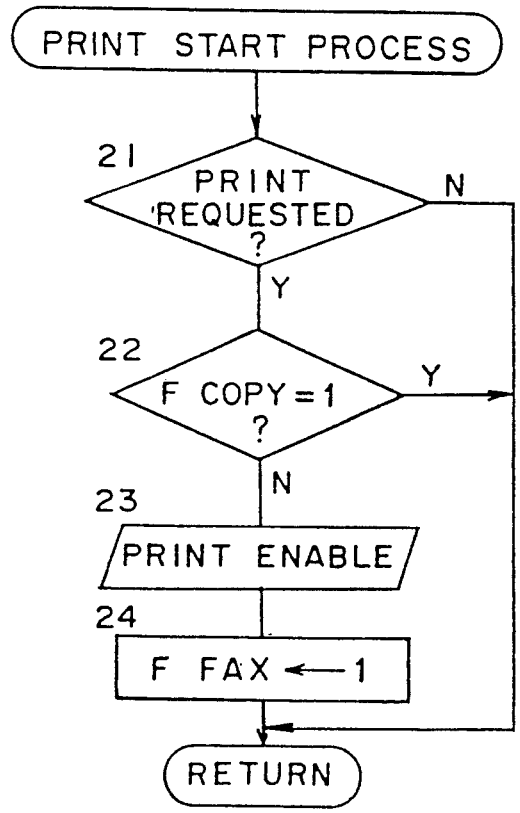

In the print start subroutine as shown in FIG. 5, it is first checked (step #21) whether a print request signal has been input from the fax CPU 31. If the print request signal has not been input, the subroutine returns to the main routine. However, if the print request signal is detected, the copy flag F-COPY is checked (step #22). If the copy flag F-COPY is set (=1), the copying operation has been started and the fax printing operation is therefore prohibited. The subroutine thus returns to the main routine. However, if the copy flag F-COPY is not set, fax printing is not prohibited. A print enable signal is therefore sent to the fax CPU 31 (step #23) and the fax flag F-FAX is set to "1" (step #24). Thereafter, the subroutine returns to the main routine.

When the print start subroutine is exited and the main routine is resumed, the "operation control" subroutine is called (step #5).

Figure 6:
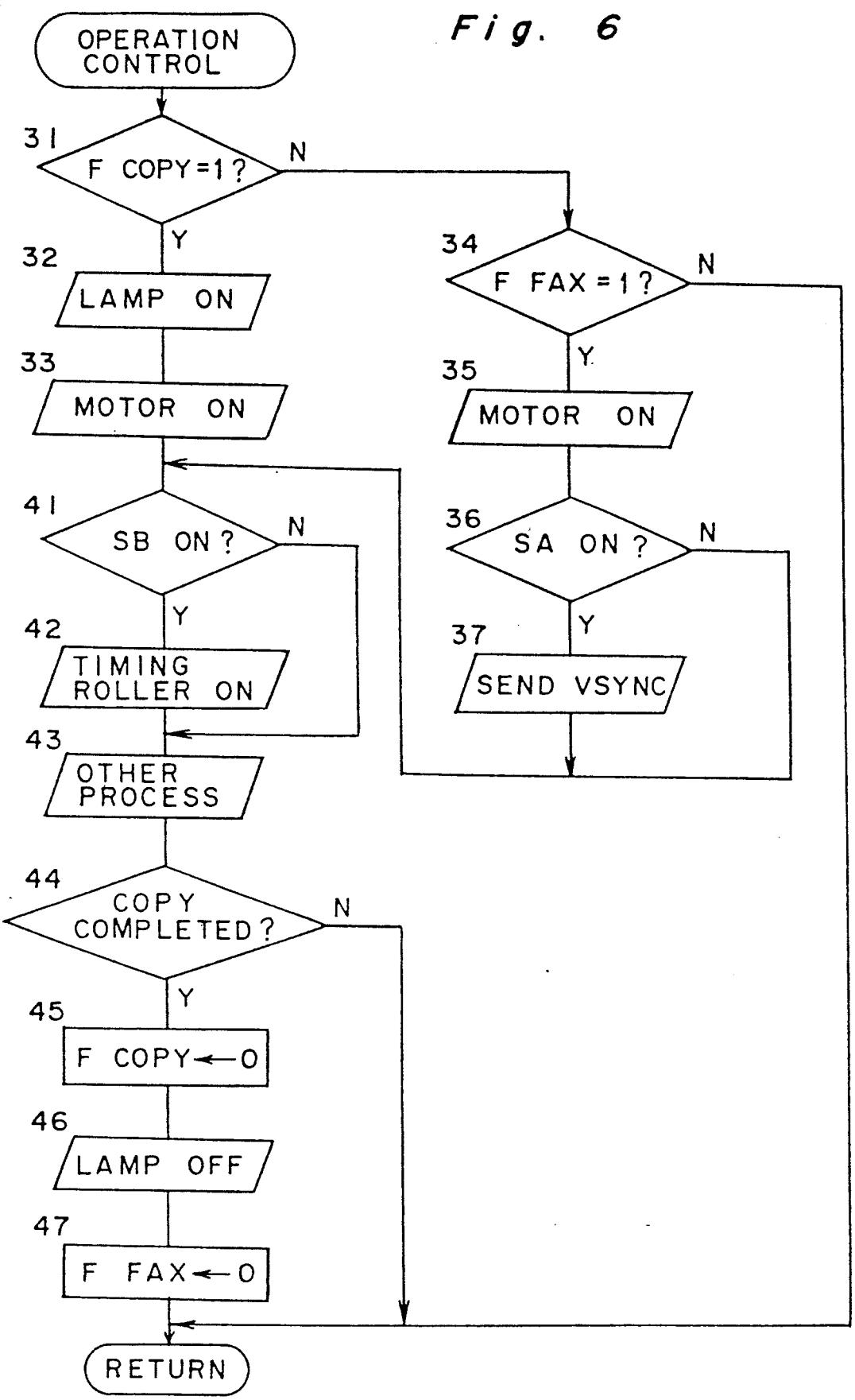

As shown in FIG. 6, the first step in the operation control subroutine is to check the copy flag F-COPY (step #31). If the copy flag F-COPY is set (=1), the copying operation should be started. The exposure lamp 2 is therefore turned on (step #32) and the drive of the scanner motor 34 is started (step #33). Thereafter, the procedure advances to step #41.

However, if the copy flag F-COPY is not set, the fax flag F-FAX is checked (step #34). If the fax flag F-FAX is not set, the copying operation and the fax printing operation are not needed, and the subroutine therefore returns to the main routine. Furthermore, if the fax flag F-FAX is set (=1), the fax printing operation starts with the exposure lamp 2 turned OFF and only the scanner motor 34 driven (step #35) to obtain the process control timing from the scanner movement as described above. The presence of a scanner detection signal from the image edge sensor $S_A$ is then checked (step #36). If the scanner detection signal is not present, the procedure advances to step #41. However, if the scanner detection signal is present, a vertical synchronization signal VSYNC described hereinbelow is sent to the fax CPU 31, and the procedure then advances to step #41.

At step #41 the presence of a scanner detection signal from the timing sensor $S_B$ is checked. If the scanner detection signal is not present, the procedure advances to step #43. However, if it is present, a clutch for the timing roller 17 is connected (step #42) to send the recording medium stopped at the timing roller 17 to the transfer unit, and then the procedure advances to step #43. At step #43 all other processes other than those described hereinabove, including operations of the charger unit 11 and developer units 13 and 14, are controlled.

It is then checked at step #44 whether the copying operation is completed. If it is not, the subroutine is exited to the main routine. However, if the copying operation is completed, the copy flag F-COPY is reset to "0" (step #45), an OFF control signal is output to the exposure lamp 2 (step #46), the fax flag F-FAX is also reset to "0" (step #47), and the subroutine then exits to the main routine.

When the operation control subroutine is exited and the main routine is resumed, the "other processes subroutine", which includes operation checks and display controls, is called (step #6). When this subroutine is exited back to the main routine, the internal timer count is repeatedly checked for equality to a predetermined value (the "time-up" count) (step #7) until all operations for one cycle are completed. The procedure then loops back to step #2, after which the above main routine is repeated.

Figure 7:
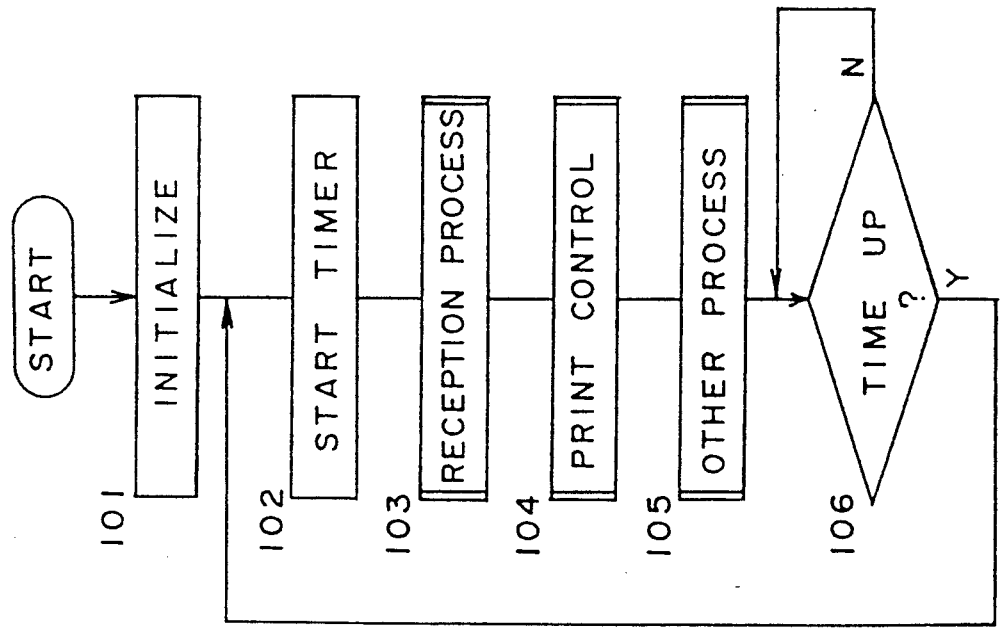

FIG. 7 is a flow chart of the main routine executed by the fax CPU 31. When this main routine starts, system flags are reset and memories are cleared (step #101), after which the internal timer is started (step #102). A series of subroutines are then called, the first of which is the "fax receive" subroutine shown as step #103.

Figure 8:
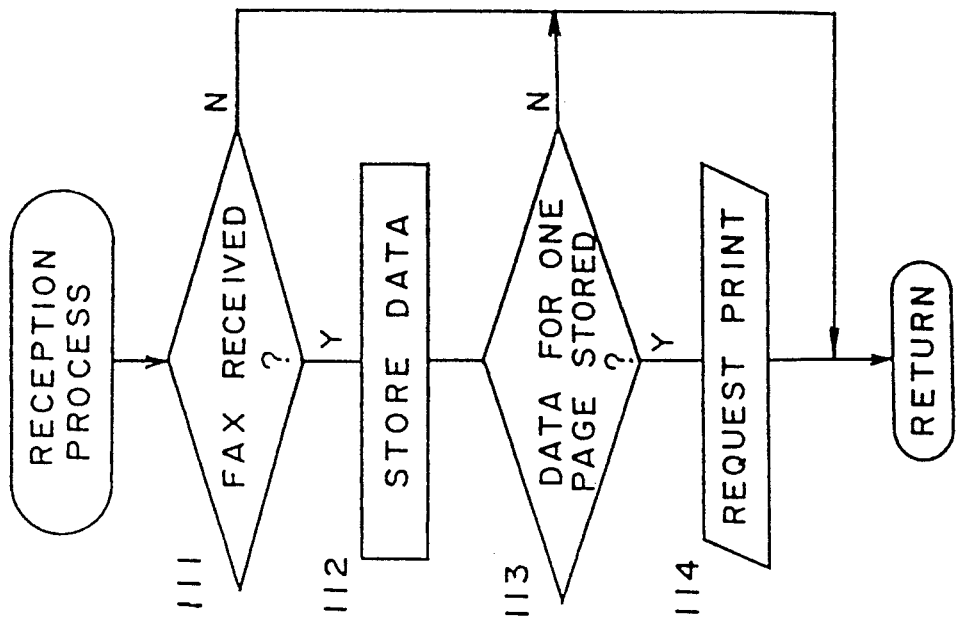

As shown in FIG. 8, the first step in the fax receive subroutine is to check whether a fax calling signal has been received (step #111). If it has not, the subroutine returns to the main routine. If the fax calling signal is received, the received data is stored in the page memory 35 (step #112) and it is then checked whether the data for one page has been stored (step #113). If the stored data is not equivalent to one full page, the subroutine returns to the main routine. If the stored data is equivalent to one full page, a print request signal is output (step #114) to the copier CPU 30 to start the facsimile printing operation, and the subroutine exits to the main routine.

After returning from the fax receive subroutine, the "print control" subroutine is called (step #104).

Figure 9:
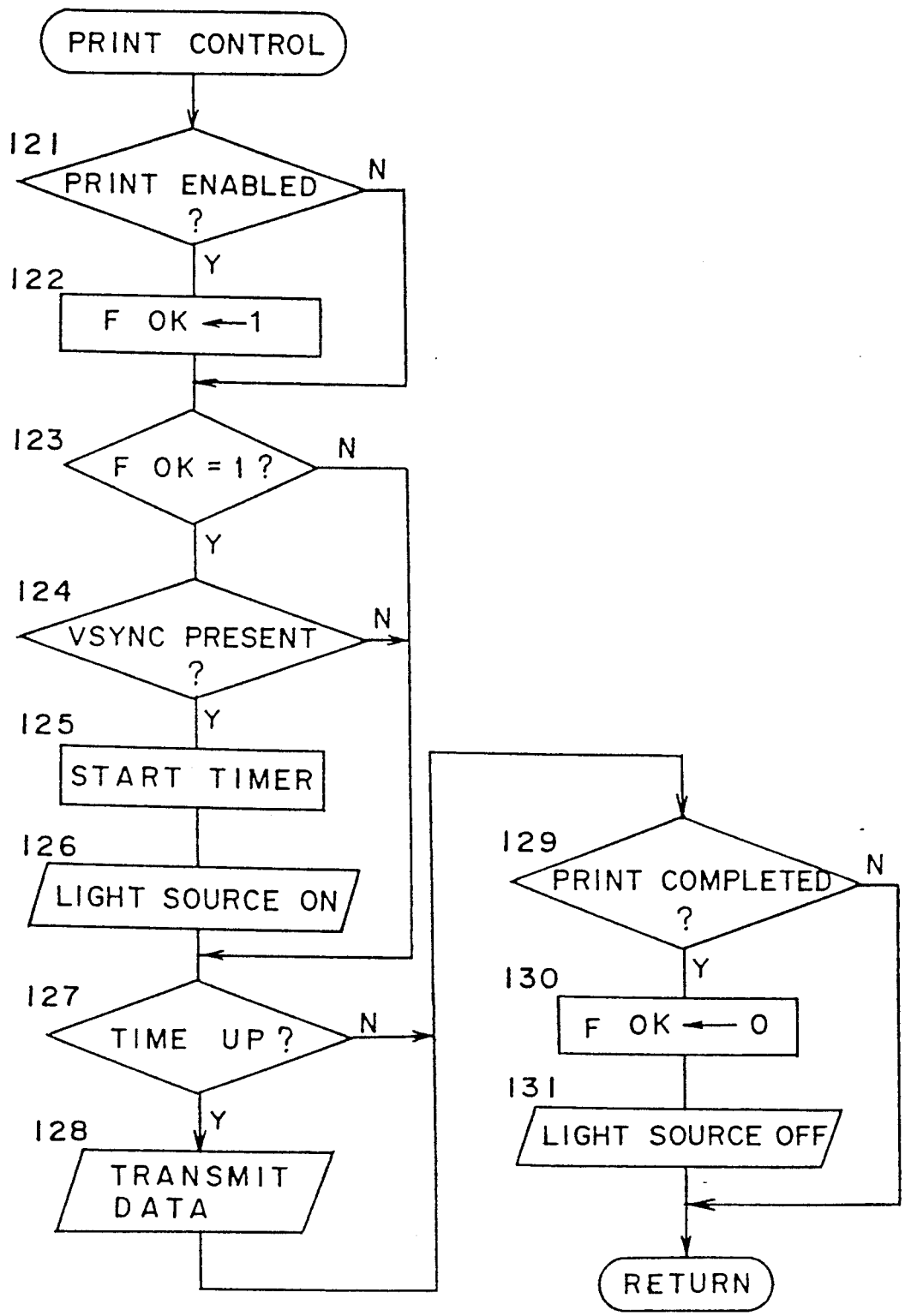

As shown in FIG. 9, the first step in the print control subroutine is to check for the print enable signal from the copier CPU 30 (step #121). An enable flag F-OK is set to "1" (step #122) only when the print enable signal is present. The state of the enable flag F-OK and the presence of the vertical synchronization signal VSYNC from the copier CPU 30 are then checked (steps #123 and #124). Only if the enable flag F-OK is set (=1) and the vertical synchronization signal VSYNC is present, a synchronization control timer T is started (step #125) and the light source 6 in the optical print head 9 is turned on (step #126).

The timer T delays transmission of the image data for a predetermined time to eliminate an offset in the positions of the optical print head 9 and the exposure area 10 in the rotational direction of the photoconductor 4, and to assure that the position of latent electrostatic image formation is the same in the fax printing operation as in the copying operation. The exposure area 10 is an area where the latent electrostatic image is formed during the copying operation, Data transmission (step #128) is skipped until the timer T has incremented to a predetermined value, at which time the stored contents of the page memory 35 are sent to the optical print head controller 36 and the fax printing operation is started (steps #127 and #128).

It is then checked whether the fax printing operation is completed (step #129). If it is not, the subroutine exits to the main routine. However, if it is completed, the enable flag F-OK is reset to "0" (step #130), the light source 6 of the optical print head 9 is turned OFF (step #131), and the subroutine then exits to the main routine.

When the print control subroutine is exited to the main routine, the "other processes" subroutine, which includes operation checks and display controls, is called (step #105). After this subroutine is exited, the internal timer count is repeatedly checked for equality to a predetermined value (the "time-up" count) (step #106) until all operations for one cycle are completed. The procedure then loops back to step #102, after which the above procedure is repeated.

Another embodiment of the present invention is described hereinbelow with reference to FIGS. 10-21.

Figure 10:
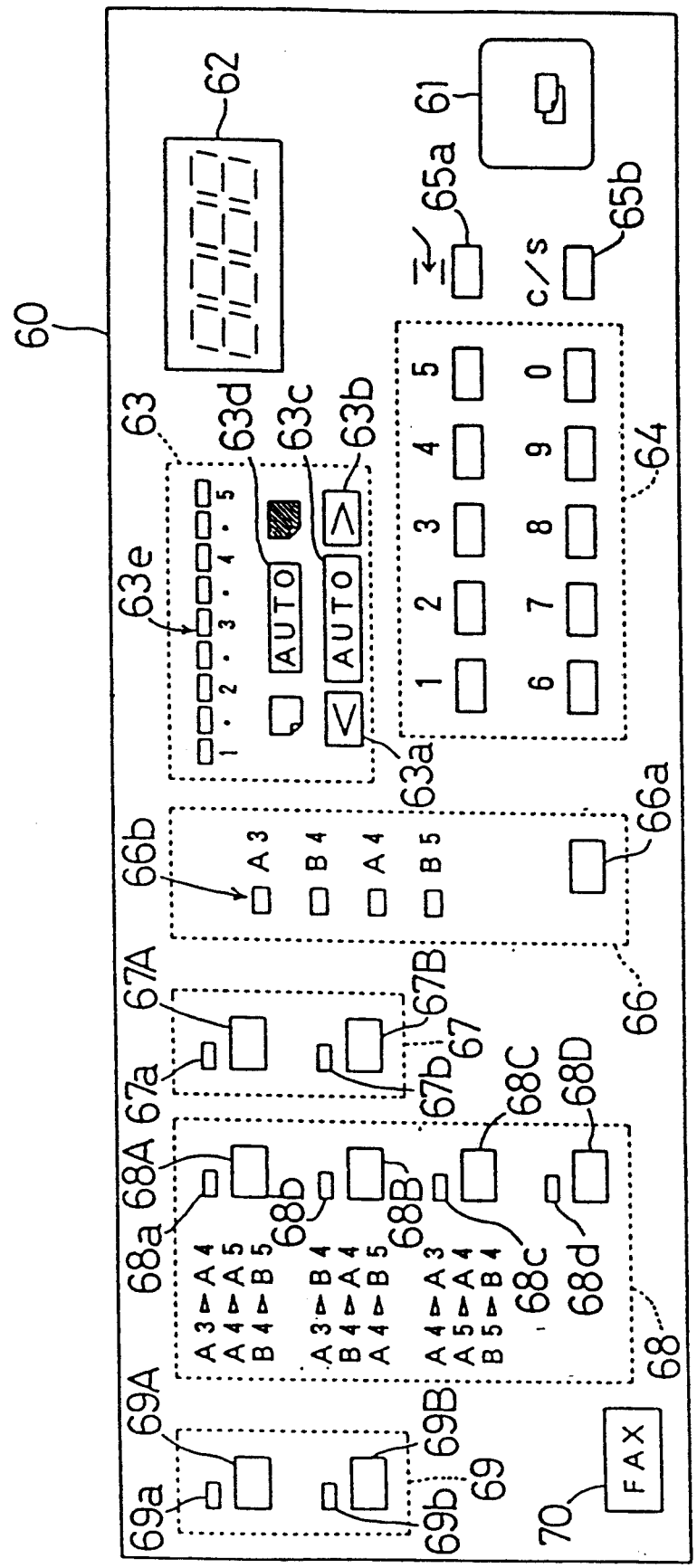
FIG. 10 is a top plan view of an operation panel mounted on a recording apparatus according to another embodiment of the present invention.

FIG. 10 depicts an operation panel 32 according to this embodiment of the present invention.

A copy start key 61 is used to start the copying operation, and a digital display 62 is used to display the number of copies, the copy ratio, and other information.

A copy exposure controller 63 is used to set the copy density by operation of two keys 63a and 63b. A third key 63c selects automatic copy exposure control, which is indicated by an automatic exposure control LED 63d. The set copy density is indicated by a density display LED group 63e.

A numeric keypad 64 is used to set the number of copies, the copy ratio, and other settings by depressing the desired keys. An interrupt key 65a and a clear/stop key 65b, which is used to clear the copy number and other settings entered with the keypad 64 and to cancel the copying operation, are also provided.

A paper selection area 66 includes a selection key 66a and an LED group 66b which indicates the selected paper size.

A developer color selector 67 selects one of a pair of developer units 13 and 14 to develop the duplicated image according to the selected color key, black 67A or red 67B. LED indicators 67a and 67b indicate the selected developer color.

A fixed copy ratio selector 68 comprises four keys 68A-68D for selection of three preset copy ratios for enlarging or reducing the original M by proportionally equal amounts on the vertical and horizontal, and for quick selection of a same-size copy ratio to make a copy the same size as the original M. Respective LED indicators 68a-68d are provided to indicate the selected fixed copy ratio.

A sort mode selector 69 is used to select or deselect copy sorting using a sorter 23 as controlled by a non-sort mode key 69A and a sort mode key 69B. The selected sort mode is indicated by sort mode indicator LEDs 69a and 69b, respectively.

A fax print LED 70 lights steady during printing of a received facsimile signal to inform the user that the copying operation is disabled because, as described previously above, copying is prohibited during facsimile printing. It is to be noted that indication of facsimile printing may also be accomplished by, for example, providing an LED inside the copy start key 61 and turning this LED on or changing the color of the LED during the copying operation and likewise turning the LED on or changing the color of the LED during the facsimile printing operation rather than providing a separate fax print LED 70. Furthermore, by providing this fax print indicator projected at the top of the operation panel 32 the user can easily tell, when plural recording apparatus are used, which recording apparatus is currently receiving a facsimile, thus making the fax print indicator even more effective.

The operation of a recording apparatus as described hereinabove is described below with reference to flow charts in FIGS. 11-20.

Figure 11:
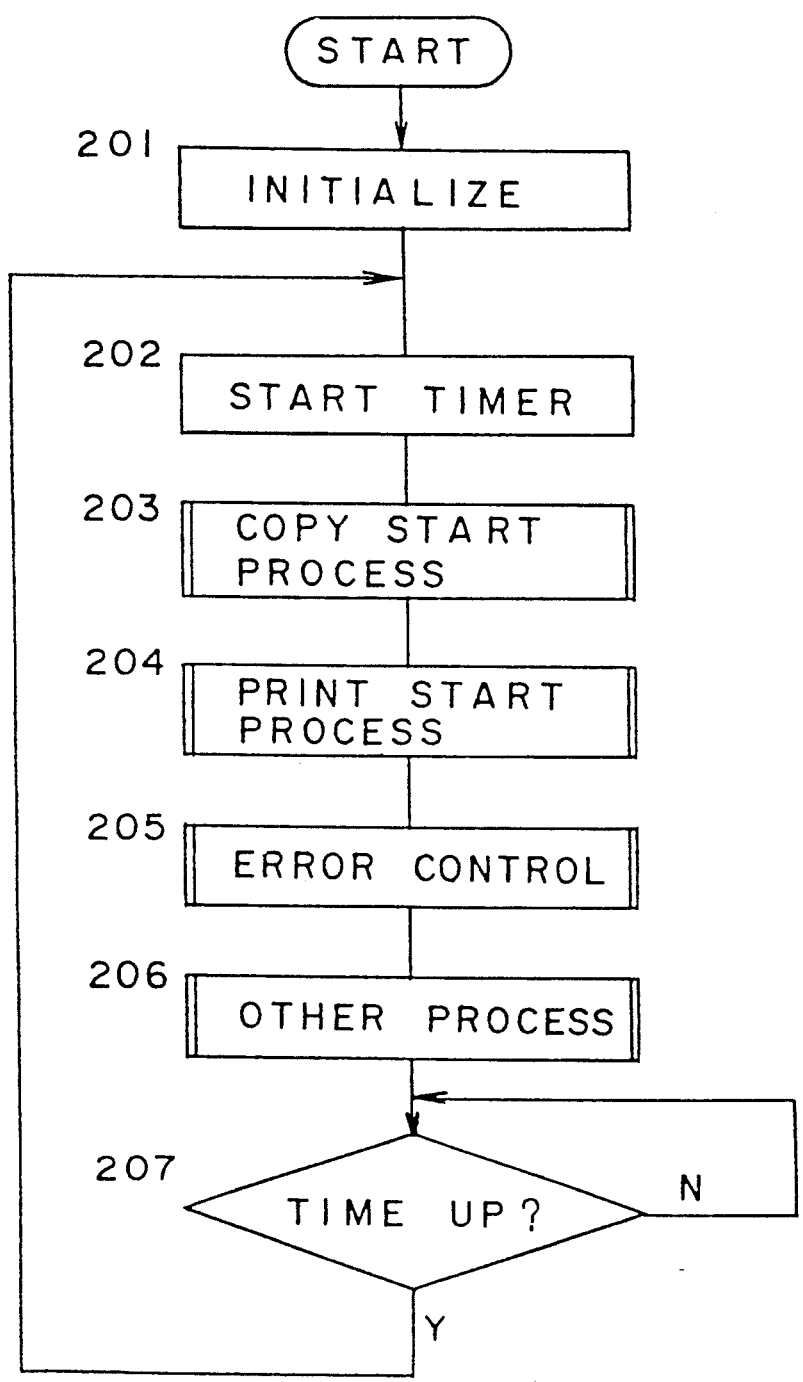

FIG. 11 is a flow chart of the main routine executed by the copier CPU 30. When this routine starts, system flags are reset and memories are cleared (step #201), after which an internal timer is started (step #202). A series of subroutines are then called, the first of which is the "copy start process" subroutine shown as step #203.

Figure 12:
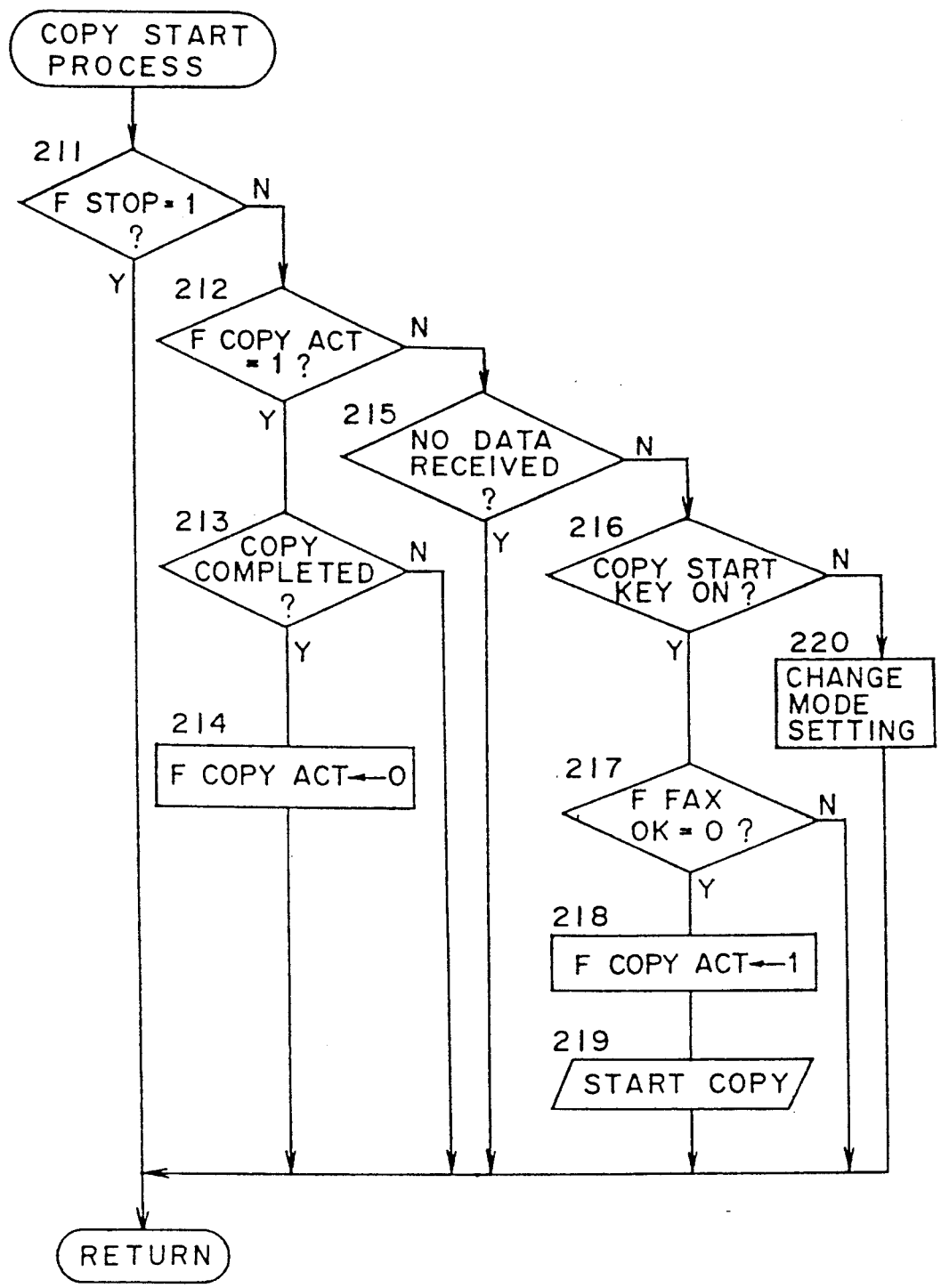

The copy start subroutine starts, as shown in FIG. 12, by checking a stop flag F-STOP (step #211). As will be described hereinafter, the stop flag F-STOP is set (=1) when an error occurs during the copying process. If the stop flag F-STOP is set (=1), an error has occurred and the subroutine therefore returns to the main routine. However, if the flag is not set, a copy-in-progress flag F-COPY-ACT is checked (step #212). If the copy-in-progress flag F-COPY-ACT is set (=1), a copy was being made and it is therefore necessary to check if the copying operation is completed (step #213). If the operation is not completed the subroutine exits to the main routine, and if the operation is completed the copy-in-progress flag F-COPY-ACT is reset to "0" (step #214), and the subroutine exits to the main routine.

If, however, it is determined at step #212 that copying is not in progress, data from the operation panel 32 is checked for (step #215). If no data has been received from the operation panel 32, the subroutine exits to the main routine, but if there is such data present it is determined if the operation is a result of the copy start key 61 being depressed (step #216). If the copy start key 61 was depressed, a fax enable flag F-FAX-OK is checked (step #217).

The fax enable flag F-FAX-OK is set (=1) when there is a print request from the fax CPU 31 as will be described hereinbelow. If the fax enable flag F-FAX-OK is not "0", a fax is being printed and the start of the copying operation is prohibited. The subroutine therefore exits to the main routine. However, if the fax enable flag F-FAX-OK is "0", fax printing has not been started. The copy-in-progress flag F-COPY-ACT is therefore set (=1) (step #218), the required control signals are output to start the copying operation (step #219), and the subroutine exits to the main routine.

If at step #216 it is determined that the copy start key 61 had not been depressed, a mode setting change occurred. The setting changes are therefore implemented (step #220), and the subroutine exits to the main routine.

Returning to FIG. 11, when the copy start subroutine is exited and the main routine is resumed, the "print start" subroutine is called (step #204).

Figure 13B:
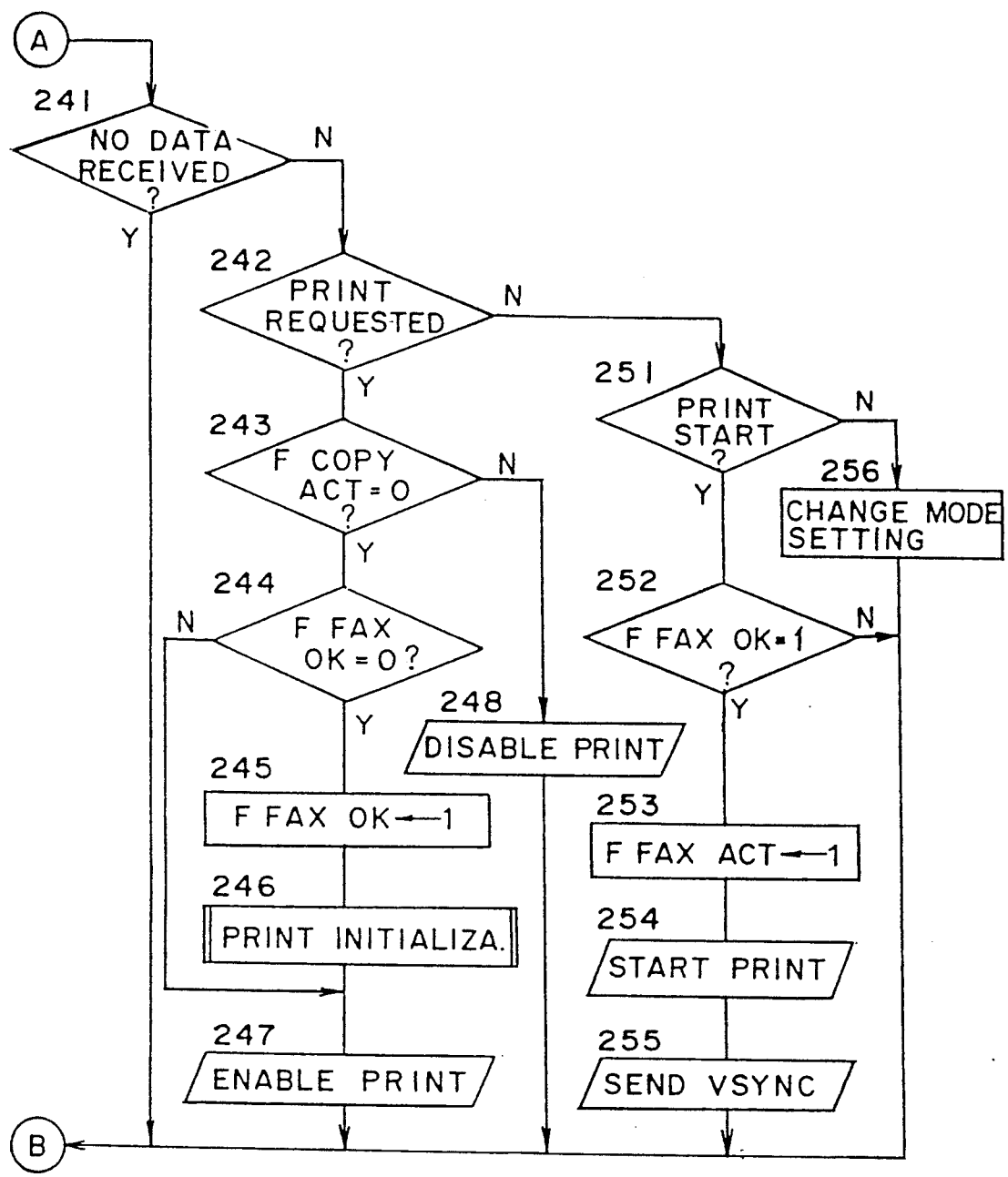

In the print start subroutine as shown in FIG. 13, the first step is to check the stop flag F-STOP (step #231). If the stop flag F-STOP is set (=1), an error has occurred, and the presence of received data from the fax CPU 31 is checked (step #232). If there is no such received data, the subroutine returns to the main routine. If data has been received from the fax CPU 31, however, it is checked whether the data is the print request signal (step #233). If it is, a print disable signal indicating that the facsimile printing operation is disabled is sent to the fax CPU 31 (step #234) and then the subroutine exits to the main routine. However, if it is not, the subroutine exits directly to the main routine.

If at step #231 the stop flag F-STOP is not set (=1), no error has occurred. The next step then is to check a fax printing flag F-FAX-ACT (step #235). If the fax printing flag F-FAX-ACT is set (=1), the fax printing operation is in progress and it is therefore checked whether the fax printing operation has ended (step #236). If fax printing has not been completed, the subroutine returns to the main routine, but if it has then the "print end" subroutine is called (step #237).

Figure 15:
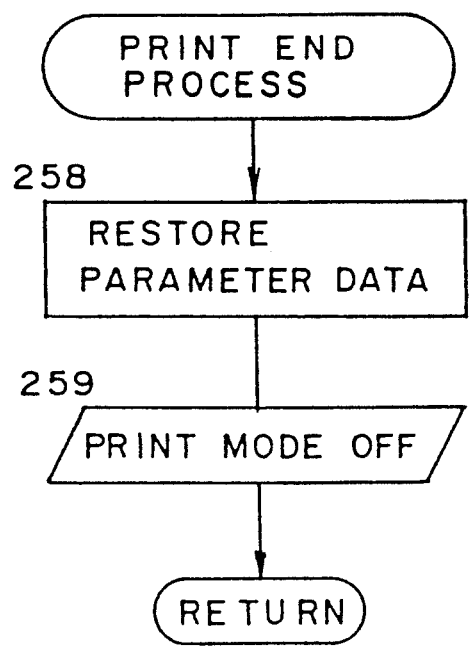

The print end subroutine is described in detail below. During the fax printing operation, parameters for the copying operation settings are temporarily cleared and the fax printing conditions are set. The function of the print end subroutine is to cancel these settings. In the print end subroutine as shown in FIG. 15, parameter data for the copying operation stored in a separate area (in a control memory 33 shown in FIG. 2) is restored (step #258), a fax print mode indicator is canceled (specifically, the fax print LED 70 is turned off) (step #259), and the subroutine then returns to the previous routine.

Returning to the print start subroutine from the print end subroutine, the fax printing flag F-FAX-ACT is reset to "0" (step #238) and a fax enable flag F-FAX-OK is reset to "0" (step #239), a print end signal is sent to the fax CPU 31 (step #240), and the subroutine then exits to the main routine.

If at step #235 the fax printing flag F-FAX-ACT is not set (=0), the fax printing operation is not in progress and the presence of data from the fax CPU 31 is checked (step #241). If there is no data from the fax CPU 31, the subroutine exits to the main routine. If there is data, it is checked whether the data is the print request signal (step #242).

If the received data is the print request signal, the state of the copy-in-progress flag F-COPY-ACT is checked. If the copy-in-progress flag F-COPY-ACT is reset (=0), a copying operation is not in progress and the fax printing operation is therefore possible. The fax enable flag F-FAX-OK is therefore checked (step #244). If the fax enable flag F-FAX-OK is reset (=0), this flow sequence is successfully passed for the first time. The fax enable flag F-FAX-OK is therefore set to "1" (step #245), and the "print initialization" subroutine is called (step #246).

Figure 14:
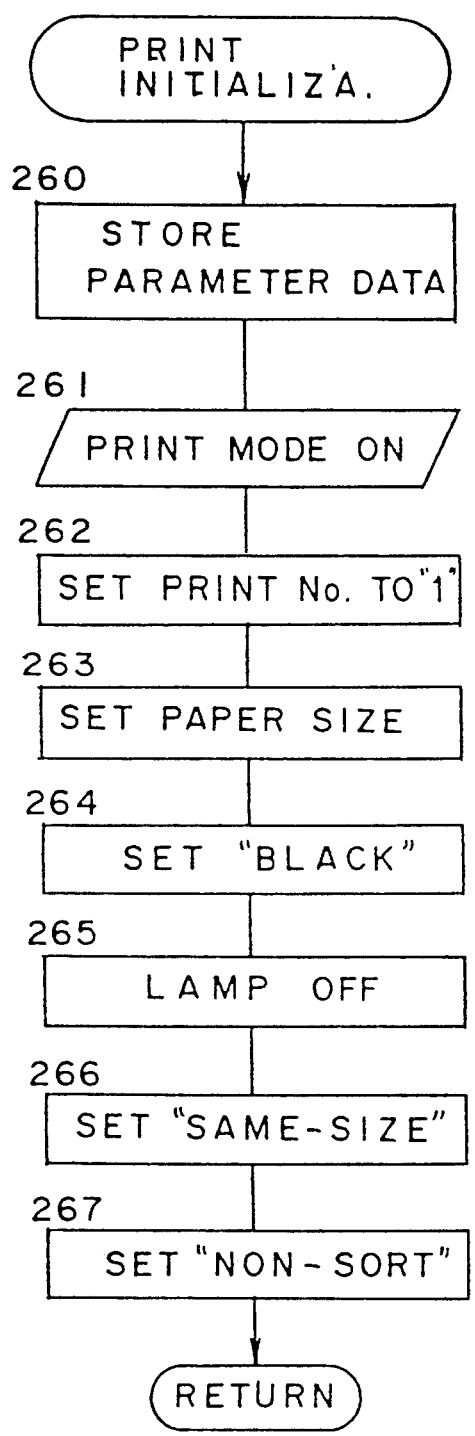

The print initialization subroutine temporarily clears copying conditions and sets printing conditions suited to receiving a facsimile when the printing operation is performed in an interrupt mode due to receiving a facsimile signal when certain copying conditions are set. In this print initialization subroutine, as shown in FIG. 14, the parameter data for the set copying operation is stored to a different area (specifically in the control memory 33) (step #260), and the fax printing operation is indicated (specifically, the fax print LED 70 is turned off) (step #261). The print number is then set to "1" (step #262), the paper size is set to A4 (step #263), the developer color is set to "black" (step #264), the exposure lamp 2 is turned off (step #265), the copy ratio is set to "same-size" (step #266), the sort mode is set to "non-sort" (step #267), and the subroutine then returns to the previous routine.

After returning to the print start subroutine from the print initialization subroutine, the procedure advances to step #247. If the fax enable flag F-FAX-OK was not reset to "0" at step #244, the print initialization subroutine had already been called and steps #245 and #246 were therefore skipped, advancing directly to step #247. At step #247 a print enable signal is sent to the fax CPU 31, after which the print start subroutine returns to the main routine. If at step #243 the copy-in-progress flag F-COPY-ACT is not reset (=0), the copying operation is in progress. A print disable signal is therefore sent to the fax CPU 31 (step #248), and the subroutine exits to the main routine.

Furthermore, if at step #242 the received data is not the print request signal, it is determined if the received data is a print start signal (step #251). If the received data is the print start signal and the fax enable flag F-FAX-OK is set (=1) (step #252), the fax printing operation can be started. Therefore, the copy-in-progress flag F-COPY-ACT is set (=1) (step #253), the printing operation is started and a recording paper is transported to the printing area (step #254), the vertical synchronization signal to start transmission of the print data is sent to the fax CPU 31 (step #255), and the subroutine exits to the main routine. If, however, the fax enable flag F-FAX-OK was not set (=1) at step #252, the fax printing operation is not started and the subroutine returns to the main routine.

Furthermore, if at step #251 the received data was not the print start signal, it was a mode setting signal transmitted with the facsimile signal or other signal. The appropriate settings are therefore made according to that signal (step #256), and the subroutine exits to the main routine.

Following the return to the main routine from the print start subroutine in FIG. 11, the "operation error control" subroutine is called (step #205).

Figure 16A:
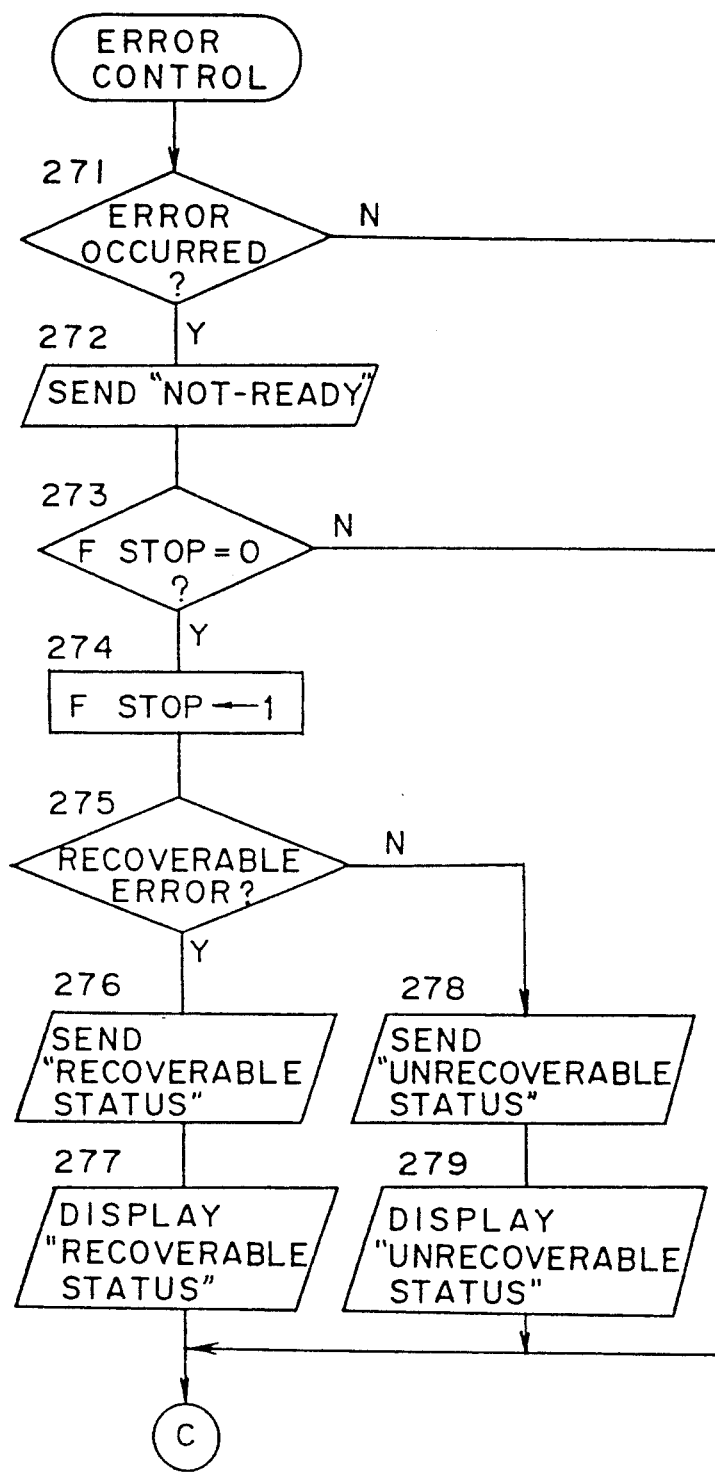
Figure 16:
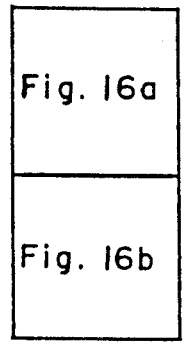
Figure 16B:
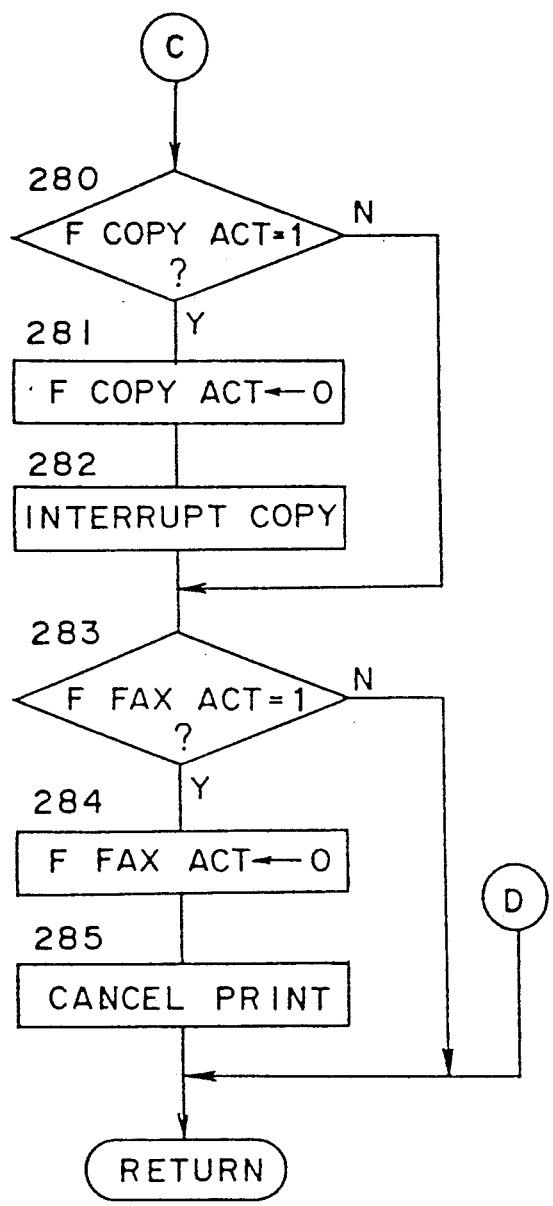

As shown in FIG. 16, it is first determined in the operation error control subroutine whether the error is in the recording apparatus (step #271). If it is, a PRINTER NOT READY signal is sent to the fax CPU 31 as a printer status signal (step #272), and the stop flag F-STOP is then checked (step #273). If the stop flag F-STOP is not reset (=0), the following steps are skipped as the procedure advances to step #280. If the stop flag F-STOP is reset (=0), the stop flag F-STOP is immediately set (=1) (step #274), and it is determined whether the error is a recoverable error (step #275).

A recoverable error is any error, such as a NO PAPER error or a paper jam, which is relatively minor and can be easily corrected by the user. Unrecoverable errors include problems with the motor, the light source 6 in the optical print head 9, and other problems which cannot be corrected by the average user and require servicing by a qualified technician.

Based on the result of step #275, whether the error is recoverable or unrecoverable (steps #276 and #278) is sent to the fax CPU 31, the result is displayed on the display 62 using a segment display, and the procedure advances to step #280.

At step #280 the copy-in-progress flag F-COPY-ACT is checked. If the copy-in-progress flag F-COPY-ACT is not set, the copying operation is not in progress and the following steps are skipped as the procedure advances to step #283. If the copy-in-progress flag F-COPY-ACT is set (=1), copying is in progress. The copy-in-progress flag F-COPY-ACT is therefore reset (=0) (step #281), the copying operation is interrupted (step #282), and the procedure advances to step #283.

At step #283 the fax printing flag F-FAX-ACT is checked. If the fax printing flag F-FAX-ACT is not set (=1), a fax is not being printed. The following steps are therefore skipped and the subroutine returns to the previous routine.

However, if the fax printing flag F-FAX-ACT is set (=1), a fax is being printed. The fax printing flag F-FAX-ACT is therefore reset (=0) (step #284), the fax printing operation is canceled (step #285), and the subroutine returns to the previous routine.

If at step #271 it is determined that the error is not in the recording apparatus, a PRINTER READY signal is sent to the fax CPU 31 as a printer status signal (step #291). It is to be noted that the PRINTER READY and the PRINTER NOT READY signals differ only in part. Next, the stop flag F-STOP is checked (step #292). If the stop flag F-STOP is not set, the error is not a pre-existing error, and the subroutine returns to the previous routine. If the stop flag F-STOP is set (=1), however, a pre-existing error has been recovered. The stop flag F-STOP is therefore reset (=0) (step #293), the error display in the display 62 is canceled (step #294), and the subroutine returns to the previous routine.

Returning to the main routine following the operation error control subroutine, the "other processes subroutine", which includes operation checks and display controls, is called (step #206). When this subroutine is exited back to the main routine, the internal timer count is repeatedly checked for equality to a predetermined value (the "time-up" count) (step #207) until all operations for one cycle are completed. The procedure then loops back to step #202, after which the above main routine is repeated.

Figure 17:
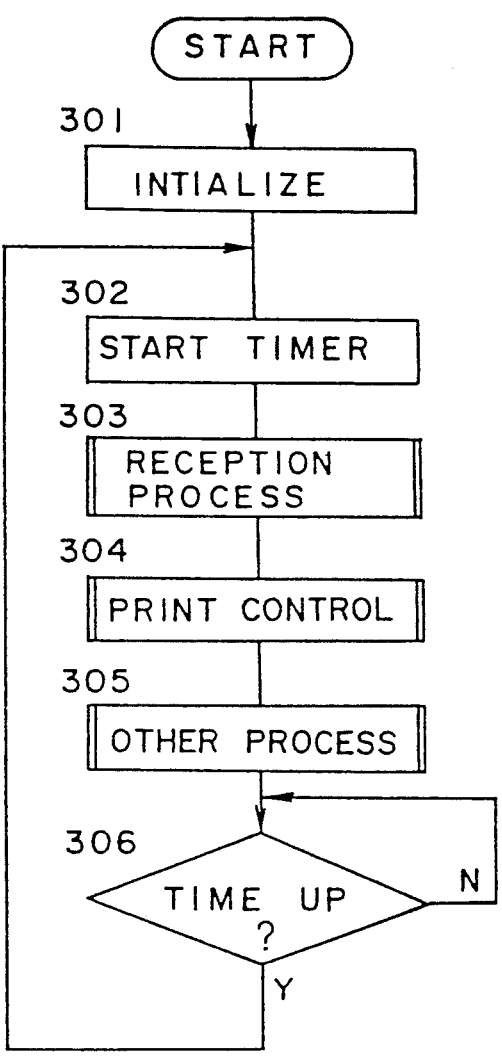

FIG. 17 is a flow chart of the main routine executed by the fax CPU 31. When this main routine starts, system flags are reset and memories are cleared (step #301), after which the internal timer is started (step #302). A series of subroutines are then called, the first of which is the "fax receive" subroutine shown as step #303.

Figure 18B:
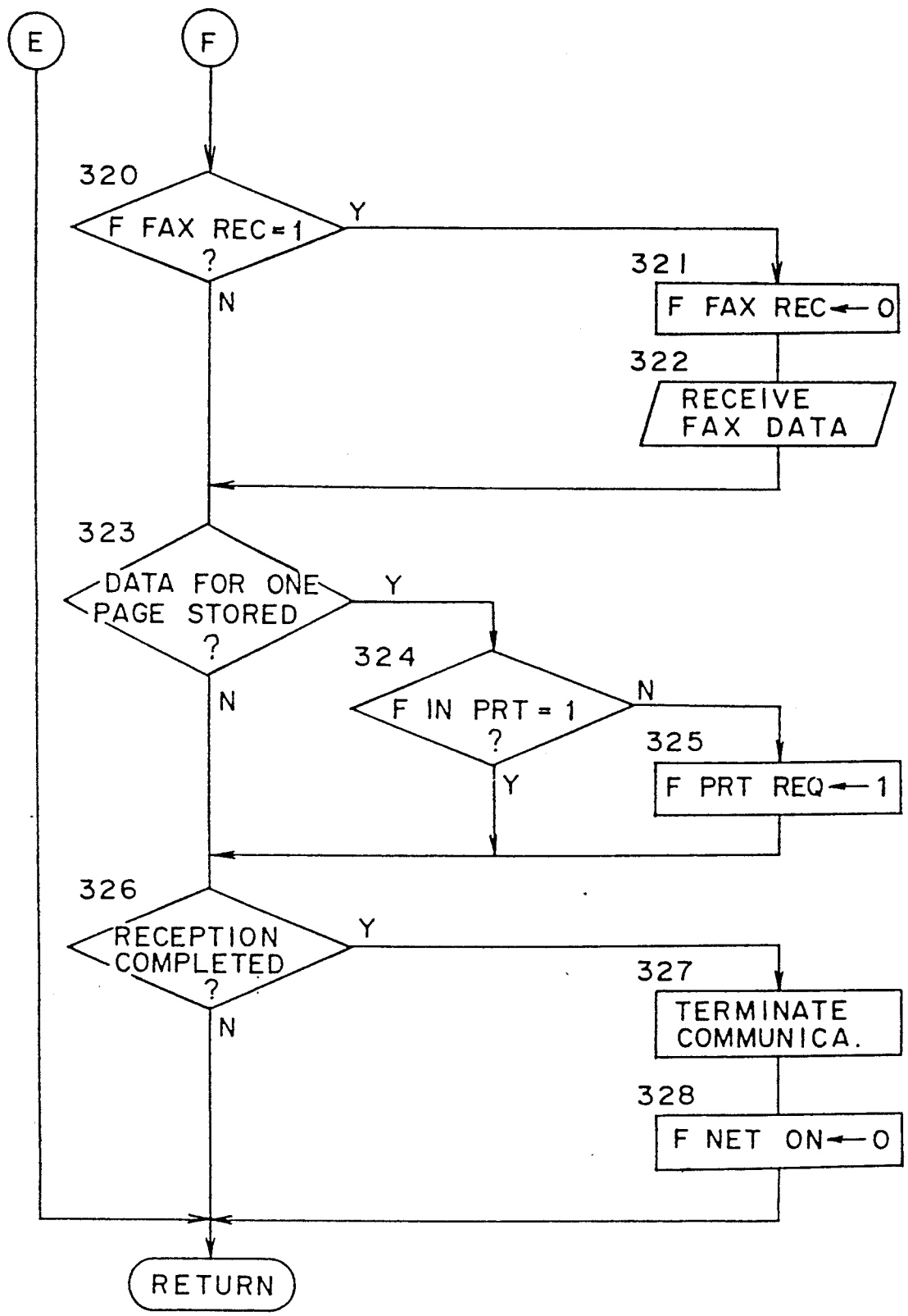

As shown in FIG. 18, the first step in the fax receive subroutine is to check a line flag F-NET-ON (step #311). The line flag F-NET-ON is set (=1) when there is a communications connection to the fax CPU 31. If the line flag F-NET-ON is not set, there is no communications connection, but the presence of a facsimile calling signal is checked (step #312). If the line flag F-NET-ON is set (=1) and a communications connection has been established, the procedure advances to step #319.

If at step #312 there is no facsimile calling signal identified, the procedure advances to step #320. If there is a facsimile calling signal, a printer ready flag F-RDY is checked (step #313). This printer ready flag F-RDY is explained in greater detail below, but is set (=1) if the PRINTER READY signal sent when the operation of the recording apparatus is normal is received. If the printer ready flag F-RDY is not set, it is known that there is an error in the recording apparatus. Communications is therefore prohibited (step #314), and the procedure advances to step #320.

If the printer ready flag F-RDY is set (=1) at step #313, the recording apparatus is operating normally.

The line flag F-NET-ON is therefore set (=1). (step #315), a fax data request is sent to a facsimile transmitting station (step #316), a data receive flag F-FAX-REC is set (=1) (step #317), and the procedure advances to step #320.

The data receive flag F-FAX-REC is checked at step #320. If the data receive flag F-FAX-REC is not set, the procedure advances directly to step #323. However, if the data receive flag F-FAX-REC is set (=1), it is reset to "0" (step #321), facsimile receiving is started (step #322), and then the procedure advances to step #323.

At step #323 it is checked whether data equivalent to one full page has been stored in the page memory 35. If not, the procedure advances directly to step #326. If the page memory 35 contains one full page, the print-in-progress flag F-IN-PRT is checked (step #324). The print-in-progress flag F-IN-PRT is set (=1) until completion of the fax printing operation after storage of one page of data is completed and the print request signal is sent to the copier CPU 30. If the print-in-progress flag F-IN-PRT is set (=1), a print request signal has already been sent and the procedure advances directly to step #326. If the print-in-progress flag F-IN-PRT is not set, it is first set (=1) (step #325), and then the procedure advances to step #326.

It is determined at step #326 whether reception of the facsimile signal has been completed. If not, the subroutine exits to the main routine, but if it has, the communications termination procedure is completed (step #327), the line flag F-NET-ON is reset (=0), and then the subroutine exits to the main routine.

If, however, a communications connection was already established at step #311, a trouble flag F-TR is checked (step #319). As will be described in detail below, the trouble flag F-TR is set (=1) when the error in the recording apparatus is an unrecoverable error.

If the trouble flag F-TR is not set, i.e., if the recording apparatus is functioning normally or if the error is a recoverable error, the sequence proceeds from step #320. If the trouble flag F-TR is set (=1), however, there is an unrecoverable error in the recording apparatus. The trouble flag F-TR is therefore reset (=0) (step #331), the communications termination procedure is executed to stop facsimile signal receiving (step #332), and the subroutine exits to the main routine.

After returning to the main routine shown in FIG. 17 from the fax receive subroutine, the "print control" subroutine is called (step #304).

Figure 19B:
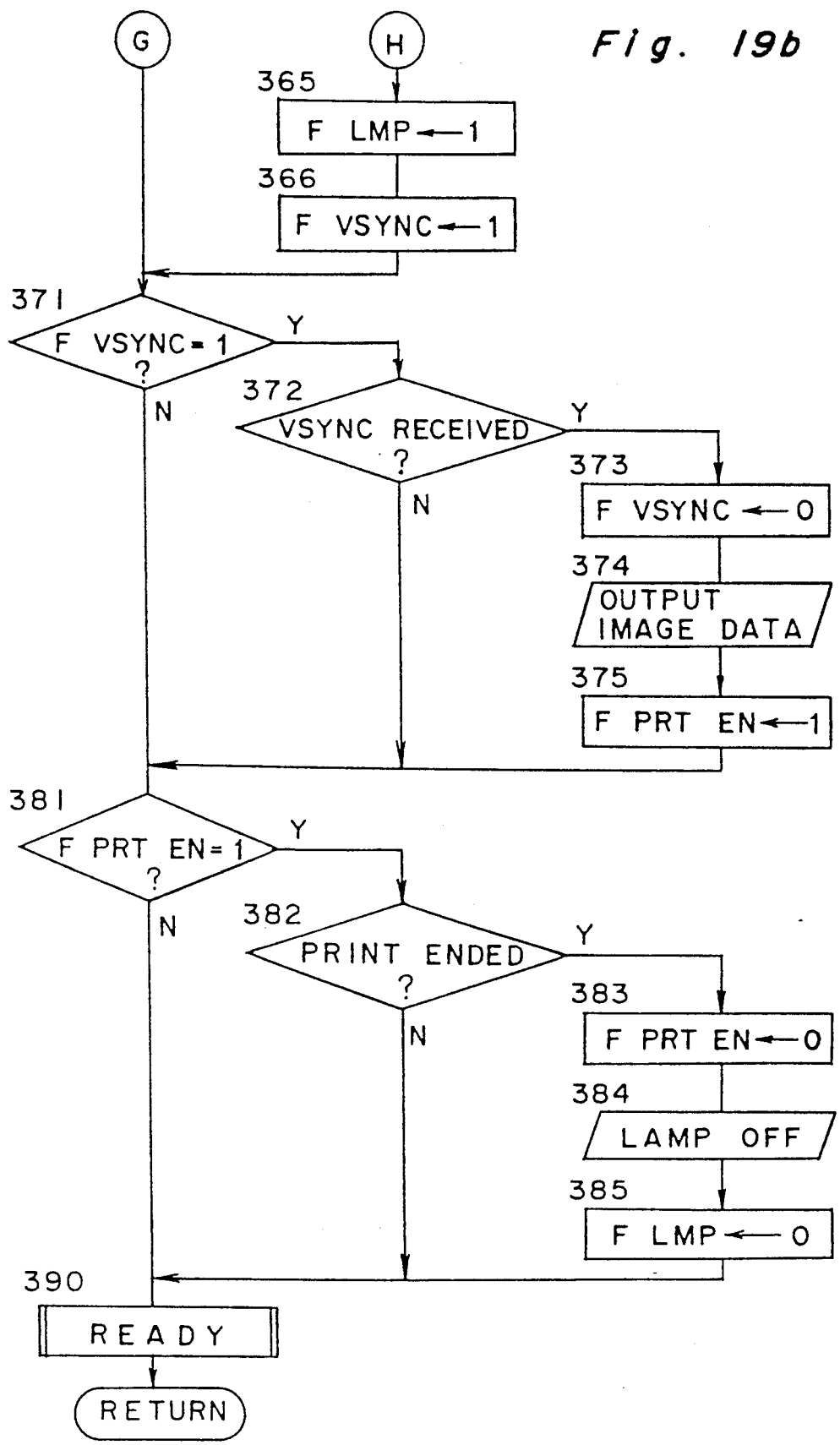

As shown in FIG. 19, the print control subroutine starts by checking a print request flag F-PRT-REQ (step #341). If the print request flag F-PRT-REQ is not set, either a print request signal has been previously sent or data equivalent to one page is not stored in the page memory 35. The following steps are therefore skipped and the procedure advances directly to step #351.

If the print request flag F-PRT-REQ is set (=1), the routine branches to send the print request signal. First, the print-in-progress flag F-IN-PRT is set (=1) (step #342), the print request flag F-PRT-REQ is reset to "0" (step #343), and the print request signal is then sent to the copier CPU 30 (step #344). The print check flag F PRT CH is then set (=1) (step #345), and the procedure advances to step #351.

After the print request signal is sent, the print check flag F-PRT-CH is set (=1) until the print enable signal or the print disable signal is received from the copier CPU 30.

At step #351, the print check flag F-PRT-CH is checked. If the print check flag F-PRT-CH is not set, either a print enable or disable signal has already been received from the copier CPU 30, and the procedure therefore advances directly to step #361. If the print check flag F-PRT-CH is set (=1), a print enable or disable signal has not been received from the copier CPU 30. The print check flag F-PRT-CH is therefore temporarily reset to "0" (step #352), and it is checked whether a print enable signal has been received from the copier CPU 30 (step #353).

If the print enable signal has not been received, the print request flag F-PRT-REQ is set (=1) (step #354) so that a print request signal is sent to the copier CPU 30 until a print enable signal is received, and the procedure advances to step #361. In this case, the result of step #341 in the next loop sends control to the steps from step #342, and a print request signal is sent as already described.

However, if the print enable signal is received, preparations are ready for the facsimile data printing operation. A print start flag F-PRT-ST is therefore set (=1) (step #355), and the procedure advances to step #361.

The print start flag F-PRT-ST is set (=1) from when the print enable signal is received until the print start signal is sent to the copier CPU 30.

At step #361 the print start flag F-PRT-ST is checked. If the print start flag F-PRT-ST is not set, either the printer is not ready for the fax printing operation or the fax printing operation has already been started, and the procedure therefore advances directly to step #371. If the print start flag F-PRT-ST is set (=1), the print start flag F-PRT-ST is first reset to "0" (step #362), and the print start signal is sent to the copier CPU 30 (step #363). When this print start signal is received by the copier CPU 30, approximately the same operation is executed as when the print start key is depressed in the copying operation. Thereafter, a control signal is sent to turn on the light source 6 in the optical print head 9 (step #364), a lamp flag F-LMP indicating that the light source 6 is on is set (=1), a vertical synchronization flag F-VSYNC used to obtain the timing for print data transmission is set (=1) (step #366), and the procedure advances to step #371. This vertical synchronization flag F-VSYNC is set (=1) from when the print start signal is sent to the copier CPU 30 until the vertical synchronization signal is received from the copier CPU 30.

If the vertical synchronization flag F-VSYNC is set (=1) at step #371, it is checked whether the vertical synchronization signal has been received from the copier CPU 30 (step #372). If the vertical synchronization flag F-VSYNC is not set, and if the vertical sync flag F VSYNC is set but the vertical synchronization signal has not been received, the procedure advances to step #381.

However, if the vertical synchronization signal has been received, the vertical synchronization flag FVSYNC is reset (=0), output of print data from the page memory 35 to the optical print head controller 36 is started (step #374), a print end flag F-PRT-EN is reset to "0" (step #375), and the procedure advances to step #381. The print end flag F-PRT-EN is set (=1) from when output of the print data starts until the print end signal is received from the copier CPU 30.

The status of the print end flag F-PRT-EN is checked at step #381. If the print end flag F-PRT-EN is set (=1), i.e., if print data has been output is being printed, then it is checked whether the print end signal has been received from the copier CPU 30 (step #382). If the print end flag F-PRT-EN is not set, and if the print end flag F-PRT-EN is set but the print end signal has still not been received, the procedure advances to step #390.

However, if the print end signal has been received, then the print end flag F-PRT-EN is reset (=0) (step #383), a control signal is sent to turn off the light source 6 of the optical print head 9 (step #384), the lamp flag F-LMP is reset (=0), and the procedure advances to step #390.

Figure 20:
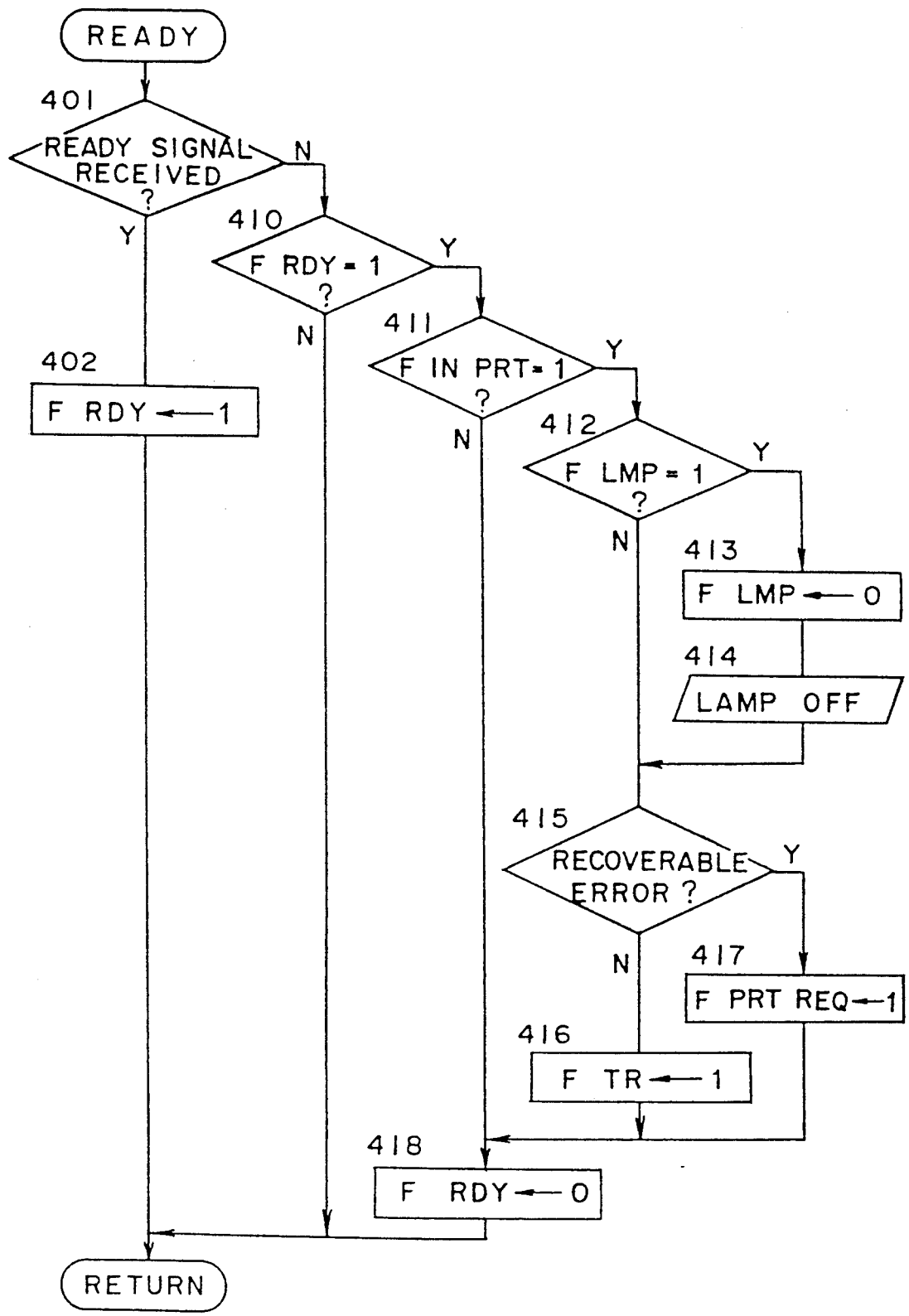

At step #390 the READY subroutine, which checks the operation of the recording apparatus, is called. As shown in FIG. 20, it is first checked at step #401 whether the recording apparatus status signal received from the copier CPU 30 is the PRINTER READY signal. If the READY signal has been received, the recording apparatus is functioning normally. The printer ready flag F-RDY is therefore set (=1) (step #402), and the subroutine exits to the previous routine.

However, if the READY signal has not been received, a recording apparatus NOT READY signal has been received. The printer ready flag F-RDY is therefore set (=1), it is determined that while operation was normal so far, an error has occurred and the print-in-progress flag F-IN-PRT is therefore checked (step #411).

If the print-in-progress flag F-IN-PRT is not set (=0), i.e., if fax printing is not in progress, the printer ready flag F-RDY is reset (=0) (step #418), and the subroutine exits to the previous routine. If the print-in-progress flag F-IN-PRT is set (=1), however, a print request signal is being output to start the fax printing operation, and the lamp flag F-LMP is therefore checked (step #412). Only if the lamp flag F-LMP is set (=1) and the light source 6 of the optical print head 9 is already turned on, the lamp flag F-LMP is reset to "0" (step #413), a control signal is output to turn off the light source 6 (step #414). Thereafter, it is determined whether the error is a recoverable error (step #415).

If the error is unrecoverable, the trouble flag F-TR is set (=1) (step #416). However, if the error is recoverable, the print request flag F-PRT-REQ is set (=1) (step #417) so that the print request signal is sent repeatedly to the copier CPU 30 until the error is recovered. Whether the error is recoverable or unrecoverable, the printer ready flag F-RDY is reset to "0" (step #418), and the subroutine then returns to the previous routine.

Returning to the print control subroutine in FIG. 19, after the READY subroutine called at step #390 is exited, the print control subroutine returns to the main routine.

When the print control subroutine is exited to the main routine, the "other processes" subroutine is called (step #305). After this subroutine is exited, the internal timer count is repeatedly checked for equality to a predetermined value (the "time-up" count) (step #306) until all operations for one cycle are completed. The procedure then loops back to step #302, after which the above procedure is repeated.

Figure 21:
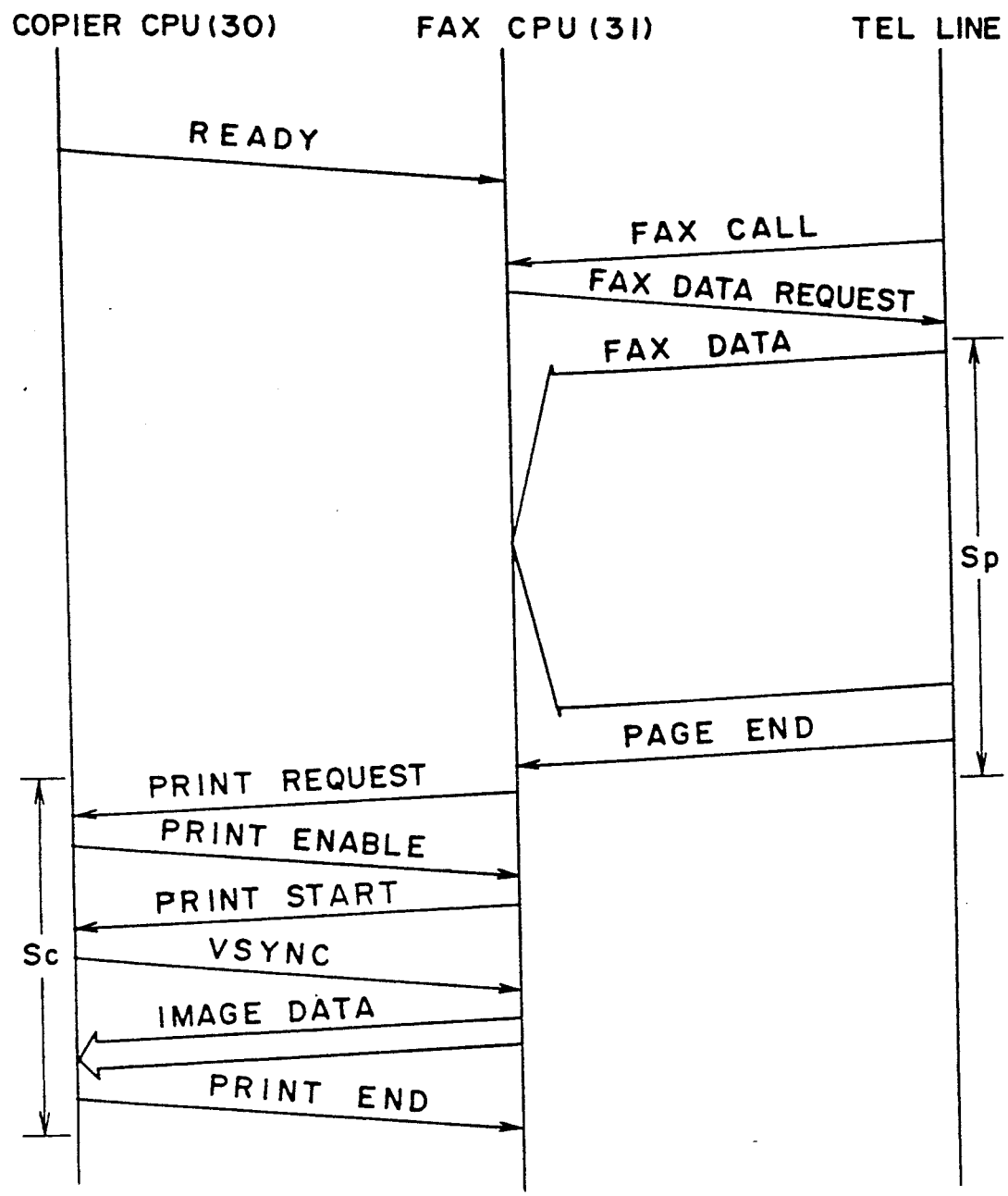
FIG. 21 is a timing chart showing the exchange of signals.

In the operation of the copier CPU 30 and the fax CPU 31 described hereinabove, the exchange of control signals between the two CPUs 30 and 31 and the telephone line is illustrated in FIG. 21. In this figure $S_c$ and $S_p$ indicate the operation for one page controlled by the internal timers of the two CPUs 30 and 31.

The facsimile data transmission rate from the telephone line is significantly slower than the process speed of the fax printing operation. As already described above, the facsimile data is stored to a page memory 35 as it is received, and when the page memory 35 contains all data for one page the fax printing operation for that page begins. The facsimile data received during this fax printing operation is stored to the open area of the page memory 35, and the page memory 35 therefore has sufficient capacity for plural pages. Therefore, when a recoverable error occurs in the recording apparatus, the facsimile data continues to be stored to the plural page capacity page memory 35.

It is to be noted that when a flow control connection is established between the facsimile transmission and receiving stations, it is possible to interrupt the facsimile transmission when a recoverable error occurs. As a result, the page memory 35 does not necessarily require a capacity sufficient to hold data received during a recoverable error.

Following alternatives may be employed in the preferred embodiments described above.

Alternative 1

In the preferred embodiments, although the original table 1 is stationary on the recording apparatus and the scanner moves relative to the stationary original table 1, the recording apparatus may be comprised such that a mobile original table is moved relative to a copying function optics assembly using a stationary exposure lamp and a rod lens array. In this case, a scanning drive mechanism will be comprised of a drive mechanism such as a motor to move the original table. In other words, it is sufficient if the scanning drive mechanism is one whereby the original table and the optics assembly are moved relative one to the other.

Alternative 2

The PLZT optical shutter array 7 used for recording means may also be replaced with a scanning laser beam, liquid crystal shutter array, LED array, or other devices. In addition, the recording means may be either a component removable from the main recording apparatus or an integral component thereof.

Alternative 3

Whereas in the preferred embodiments the scanner is moved with the exposure lamp 2 OFF during the fax printing operation, a light shield which can be inserted into the optics assembly 3 may be provided such that the light shield is moved to the light blocking position during the fax printing operation and the scanner is moved with the exposure lamp 2 on.

Alternative 4

The three sensors ($S_H$, $S_A$, $S_B$) comprising the detection means may be mechanical, magnetic, optical, or other types of detection means. Furthermore, the precise position of these detection means may be changed appropriately.

Alternative 5

In the preferred embodiments, the scanner is moved also during the fax printing operation in order to obtain a timing for the process control. Because of this, whether image formation is ready depends on the presence or absence of input of a scanner detector signal from the image edge sensor $S_A$. However, a photosensor or a microswitch for detecting a recording paper may be provided in the proximity of the timing roller 17. In this case, it is possible to send a vertical synchronization signal in response to the detection of arrival of the recording paper.

Alternative 6

In the preferred embodiments, the facsimile receiver 5 comprises a facsimile receiving function only, but both facsimile sending and receiving functions may also be provided. Furthermore, a recording control unit may be provided to output information from a host computer as recording information.

Alternative 7

Furthermore, the facsimile receiver 5 comprising a facsimile receiving function only, a facsimile receiver comprising both facsimile sending and receiving functions, or the recording control unit for controlling output of the information from the host computer as described in Alternative <6> above may be either a component removable from the main recording apparatus or an integral component thereof.

Alternative 8

In the preferred embodiments, facsimile data received over a telephone line while fax printing is prohibited is stored to the page memory 35, but it is also possible not to establish a communications line or to use flow control whereby a control signal is sent to the facsimile transmitting station to interrupt transmission of the facsimile data.

Alternative 9

In the preferred embodiments, stored information is output at the time facsimile data for one page has been stored. If the page memory 35 has room for storage, the output may be initiated at the time the fax CPU 31 has received all facsimile data. In other words, it is sufficient if the stored information is output when information stored in a storage has reached a predetermined amount.

Alternative 10

In the preferred embodiments, although a print request signal from the fax CPU 31 is sent to the copier CPU 30 when facsimile data for one page has been stored, it is possible to change this timing. For example, the print request signal may be sent at the time the fax CPU 31 has received a facsimile calling signal.

Alternative 11

Whereas in the preferred embodiments compressed data received over the telephone line is expanded and stored in the page memory 35, the compressed data itself may be stored.

Alternative 12

In the preferred embodiments, although the transmission rate for the facsimile is lower than the process speed, the present invention is applicable to the case where the former is higher than the latter.

Alternative 13

The specified conditions described in the preferred embodiments, i.e., the conditions set in the print initialization subroutine can be appropriately changed. For example, a recording apparatus having no sorter does not require the sort mode. Furthermore, if a facsimile signal has information required for specifying the recording paper size, one of a plurality of paper sizes can be selected in response thereto.

Alternative 14

Determining whether an error is a recoverable error that can be recovered within a predetermined period of time can be executed by a combination of any conventionally known suitable devices. For example, the opening or closing of a door of the apparatus can be detected by a microswitch mounted thereon and the presence or absence of recording papers can be detected by photosensors provided on the paper supply cassettes 15 and 16. Furthermore, the paper jam can be detected by a plurality of sensors provided on a paper path of the recording papers and an error which has occurred in the light source 6 can be detected by a photosensor provided on the optical print head 9. In addition, if a shortage of the recording papers is foreseen based on a comparison between the number of the remaining recording papers and that of the recording papers required for recording all facsimile data received, this may be corrected by the user as an error.

The aforementioned predetermined period of time employed as a border for the determination may be appropriately changed in accordance with the capacity of a buffer memory.

When an error has occurred, the reception of facsimile data may be continued irrespective of the kind thereof while the facsimile data is being stored in the buffer memory with an output of recording information interrupted. In this case, if the error is removed within the predetermined period of time, the output of recording information can be resumed in compliance therewith. However, the reception may be discontinued unless the error is removed after the predetermined period of time has elapsed.

Alternative 15

If the recording apparatus according to the present invention is employed in a network in which control signals can be exchanged between the facsimile transmitting and receiving stations, a warning signal indicative of the occurrence of an error may be transmitted to the facsimile transmitting station with the reception of facsimile data prohibited.

Alternative 16

In the preferred embodiments, the reception of facsimile data is prohibited irrespective of the kind of errors. However, facsimile data attended with a recoverable error may be received whereas the reception of those attended with an unrecoverable error is prohibited.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A recording apparatus comprising:
   a photoconductive member;
   an original table on which an original is placed;
   scanner means for scanning the original placed on said original table to project an image of the original onto said photoconductive member, thereby forming an electrostatic latent image on said photoconductive member;
   recording means for forming an electrostatic latent image on said photoconductive member based on an electric signal;
   visible image formation means for forming a visible image on a recording medium from the electrostatic latent image formed on said photoconductive member;
   selection means for selecting either a copy mode in which an electrostatic latent image is formed by an operation of said scanner means or a print mode in which an electrostatic latent image is formed by an operation of said recording means;
   detection means for detecting the operation of said scanner means; and
   control means for operating said scanner means in each of the copy mode and the print mode to control an operation of said visible image formation means in response to said detection means.

2. The recording apparatus according to claim 1, wherein said scanner means comprises movable components which can move along said original table.

3. The recording apparatus according to claim 2, wherein said movable components comprise a light source and at least one mirror.

4. The recording apparatus according to claim 3, wherein said control means turns on said light source in the copy mode and turns off said light source in the print mode.

5. The recording apparatus according to claim 1, wherein said recording means comprises a PLZT (Lead Lanthanum Zirconate Titanate) print head.

6. The recording apparatus according to claim 1, wherein said visible image formation means comprises a transport means for transporting said recording medium.

7. A recording apparatus comprising:
   a photoconductive member;
   an original table on which an original is placed;
   projection means for projecting an image of the original placed on said original table onto said photoconductive member to form an electrostatic latent image on said photoconductive member;
   reception means for receiving image data from a communication line and for storing the image data for at least one page;
   recording means for forming an electrostatic latent image on said photoconductive member based on the image data from said reception means;
   visible image formation means for forming a visible image on a recording medium from the electrostatic latent image formed on said photoconductive member;
   selection means for selecting either a copy mode in which an electrostatic latent image is formed by an operation of said projection means or a print mode in which an electrostatic latent image is formed by an operation of said recording means; and
   control means for operating said recording means when said reception means has stored the image data for one page in the print mode.

8. The recording apparatus according to claim 7, wherein said reception means and said recording means are removably mounted on or in an apparatus body.

9. The recording apparatus according to claim 7, wherein said recording means comprises a PLZT (Lead Lanthanum Zirconate Titanate) print head.

10. A recording apparatus comprising:
an apparatus body for electrophotographically forming a visible image on a recording medium; and
a facsimile unit for receiving image data from a communication line,
said apparatus body comprising:
a photoconductive member;
an original table on which an original is placed;
projection means for projecting an image of the original placed on said original table onto said photoconductive member to form an electrostatic latent image on said photoconductive member;
recording means for forming an electrostatic latent image on said photoconductive member based on the image data from said facsimile unit; and
visible image formation means for forming a visible image on a recording medium from the electrostatic latent image formed on said photoconductive member,
said facsimile unit comprising:
storage means for storing the image data received from the communication line;
command generation means for generating a start command required to start an operation of said apparatus body when the image data for at least one page has been stored in said storage means; and
transmission means for transmitting the image data stored in said storage means to said recording means.

11. The recording apparatus according to claim 10, wherein said recording means comprises a PLZT (Lead Lanthanum Zirconate Titanate) print head.

12. The recording apparatus according to claim 10, wherein said apparatus body further comprises detection means for detecting whether preparations required for forming the visible image on the recording medium have been made.

13. The recording apparatus according to claim 12, wherein said transmission means transmits the image data stored in said storage means to said recording means when said detection means has detected that the preparations required for forming the visible image have been made.

14. A recording apparatus comprising:
a photoconductive member;
an original table on which an original is placed;
first electrostatic latent image formation means for forming a first electrostatic latent image on said photoconductive member by projecting an image of the original placed on said original table onto said photoconductive member;
reception means for receiving image data from a communication line;
second electrostatic latent image formation means for forming a second electrostatic latent image on said photoconductive member based on the image data from said reception means;
visible image formation means for forming a visible image on a recording medium from an electrostatic latent image formed on said photoconductive member; and
prohibition means for prohibiting transmission of the image data from said reception means to said second electrostatic latent image formation means when said first electrostatic latent image formation means is in operation.

15. The recording apparatus according to claim 14, wherein said reception means and said second electrostatic latent image formation means are removably mounted on or in an apparatus body.

16. The recording apparatus according to claim 14, wherein said second electrostatic latent image formation means comprises a PLZT (Lead Lanthanum Zirconate Titanate) print head.

17. A recording apparatus comprising:
a photoconductive member;
an original table on which an original is placed;
first electrostatic latent image formation means for forming a first electrostatic latent image on said photoconductive member by projecting an image of the original placed on said original table onto said photoconductive member;
reception means for receiving image data from a communication line;
second electrostatic latent image formation means for forming a second electrostatic latent image on said photoconductive member based on the image data from said reception means;
visible image formation means for forming a visible image on a recording medium from an electrostatic latent image formed on said photoconductive member;
selection means for selecting either a copy mode in which the electrostatic latent image is formed on the recording medium by an operation of said first electrostatic latent image formation means and said visible image formation means or a facsimile mode in which the electrostatic latent image is formed on the recording medium by an operation of said second electrostatic latent image formation means and said visible image formation means;
input means for inputting arbitrary image formation conditions in the copy mode; and
setting means for setting predetermined image formation conditions irrespective of the image formation conditions input from said input means when the copy mode has been switched to the facsimile mode.

18. The recording apparatus according to claim 17, wherein said reception means and said second electrostatic latent image formation means are removably mounted on or in an apparatus body.

19. The recording apparatus according to claim 17, wherein said second electrostatic latent image formation means comprises a PLZT (Lead Lanthanum Zirconate Titanate) print head.

20. The recording apparatus according to claim 17 further comprising restoration means for restoring the predetermined image formation conditions in the facsimile mode to the arbitrary image formation conditions input from said input means when the facsimile mode has been switched to the copy mode.

21. A recording apparatus comprising:
a photoconductive member;
an original table on which an original is placed;
first electrostatic latent image formation means for forming a first electrostatic latent image on said photoconductive member by projecting an image of the original placed on said original table onto said photoconductive member;

reception means for receiving image data from a communication line;

second electrostatic latent image formation means for forming a second electrostatic latent image on said photoconductive member based on the image data from said reception means;

visible image formation means for forming a visible image on a recording medium from an electrostatic latent image formed on said photoconductive member;

detection means for detecting whether an error has occurred in said second electrostatic latent image formation means or said visible image formation means; and prohibition means for prohibiting said reception means from receiving the image data in response to said detection means.

22. The recording apparatus according to claim 21, wherein said reception means and said second electrostatic latent image formation means are removably mounted on or in an apparatus body.

23. The recording apparatus according to claim 21, wherein said second electrostatic latent image formation means comprises a PLZT (Lead Lanthanum Zirconate Titanate) print head.

24. A recording apparatus comprising:
a photoconductive member;
an original table on which an original is placed;
first electrostatic latent image formation means for forming a first electrostatic latent image on said photoconductive member by projecting an image of the original placed on said original table onto said photoconductive member;
reception means for receiving image data from a communication line;
second electrostatic latent image formation means for forming a second electrostatic latent image on said photoconductive member based on the image data from said reception means;
visible image formation means for forming a visible image on a recording medium from an electrostatic latent image formed on said photoconductive member;
detection means for detecting whether an error has occurred in said visible image formation means;
interruption means for interrupting transmission of the image data from said reception means to said second electrostatic latent image formation means when said detection means has detected an error during an image forming operation by said second electrostatic latent image formation means; and
resumption means for resuming transmission of the image data from said reception means to said second electrostatic latent image formation means when the error detected by said detection means has been removed after the transmission of the image data has been interrupted by said interruption means.

25. The recording apparatus according to claim 24, wherein said reception means and said second electrostatic latent image formation means are removably mounted on or in an apparatus body.

26. The recording apparatus according to claim 24, wherein said second electrostatic latent image formation means comprises a PLZT (Lead Lanthanum Zirconate Titanate) print head.

27. The recording apparatus according to claim 24, wherein said detection means detects an error in a transport condition of the recording medium.

28. The recording apparatus according to claim 24, wherein said detection means detects an empty condition of the recording medium.

29. A recording apparatus comprising:
a photoconductive member;
an original table on which an original is placed;
first electrostatic latent image formation means for forming a first electrostatic latent image on said photoconductive member by projecting an image of the original placed on said original table onto said photoconductive member;
reception means for receiving image data from a communication line;
second electrostatic latent image- formation means for forming a second electrostatic latent image on said photoconductive member based on the image data from said reception means;
visible image formation means for forming a visible image on a recording medium from an electrostatic latent image formed on said photoconductive member; and
prohibition means for prohibiting said first electrostatic latent image formation means from initiating an operation thereof based on an operation of said reception means.

30. The recording apparatus according to claim 29, wherein said reception means and said second electrostatic latent image formation means are removably mounted on or in an apparatus body.

31. The recording apparatus according to claim 29, wherein said second electrostatic latent image formation means comprises a PLZT (Lead Lanthanum Zirconate Titanate) print head.

32. The recording apparatus according to claim 29, wherein said reception means transmits the image data to said second electrostatic latent image formation means after the image data for at least one page has been stored in said reception means.

33. The recording apparatus according to claim 32, wherein said reception means outputs a print request signal when the image data for at least one page has been stored therein and said prohibition means prohibits said first electrostatic latent image formation means from initiating an operation thereof in response to the print request signal.

* * * * *

UNITED STATES PATENT AND TRADEMARK OFFICE
CERTIFICATE OF CORRECTION

PATENT NO. : 5,266,996
DATED : November 30, 1993
INVENTOR(S) : Koji Wakamiya, et al.

It is certified that error appears in the above-indentified patent and that said Letters Patent is hereby corrected as shown below:

In Col. 5, line 21, after "14," insert --15,--.

In Col. 15, line 59, change "FVSYNC" to --F-VSYNC--.

In Col. 16, line 25, before "set (=1)", insert --checked (step #410). If the printer ready flag F-RDY is--.

Signed and Sealed this

Twenty-sixth Day of July, 1994

Attest:

BRUCE LEHMAN

Attesting Officer *Commissioner of Patents and Trademarks*